US012556802B2

(12) United States Patent
Lee et al.

(10) Patent No.: US 12,556,802 B2
(45) Date of Patent: Feb. 17, 2026

(54) IMAGE CAPTURING USING A DISPLAY FREE BODY WEARABLE COMPUTING DEVICE

(71) Applicant: Dell Products L.P., Round Rock, TX (US)

(72) Inventors: Seungmi Lee, Singapore (SG); Si Fi Faye Li, Singapore (SG); Michiel Sebastiaan Emanuel Petrus Knoppert, Amsterdam (NL); Yan Yan, Singapore (SG); Prabu Selvaraj, Singapore (SG); Chin Leong Ong, Singapore (SG); Weiyi Wang, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/788,885

(22) Filed: Jul. 30, 2024

(65) Prior Publication Data
US 2026/0039942 A1    Feb. 5, 2026

(51) Int. Cl.
*H04N 23/00* (2023.01)
*H04N 13/156* (2018.01)
(Continued)

(52) U.S. Cl.
CPC ......... *H04N 23/611* (2023.01); *H04N 13/156* (2018.05); *H04N 13/239* (2018.05); *H04N 23/62* (2023.01)

(58) Field of Classification Search
CPC .. H04N 23/611; H04N 13/156; H04N 13/239; H04N 23/62
See application file for complete search history.

(56) References Cited

U.S. PATENT DOCUMENTS

| 4,907,296 A * | 3/1990 | Blecha | A42B 3/042 |
| | | | 2/6.2 |
| 5,856,811 A * | 1/1999 | Shih | G02B 27/0176 |
| | | | 345/8 |

(Continued)

FOREIGN PATENT DOCUMENTS

| CA | 3223178 A1 | 12/2022 |
| WO | 2020/257329 A1 | 12/2020 |

(Continued)

OTHER PUBLICATIONS

Md Messal Monem Miah et al., "Multimodal Contextual Dialogue Breakdown Detection for Conversational AI Models", NAACL 2024 Industry Track, arXiv:2404.08156v1, Apr. 11, 2024, <https://arxiv.org/abs/2404.08156v1>, retrieved on Jul. 24, 2024 (12 pages).

(Continued)

*Primary Examiner* — Frank F Huang
(74) *Attorney, Agent, or Firm* — WOMBLE BOND DICKINSON (US) LLP

(57) ABSTRACT

Methods and systems for capturing images of a scene using a display free body wearable computing device are disclosed. The method may include obtaining any number and/or types of user inputs from a user of the display free body wearable computing device. The user inputs may include, for example, voice commands, gestures, and/or any other user inputs. The method may also include interpreting a user input of the user inputs to identify a portion of the scene that the user wishes to capture in an image of the images. Once identified, using at least two image sensors, the display free body wearable computing device may capture and combine a stereo image depicting the desired portion of the scene to obtain a desired image.

20 Claims, 14 Drawing Sheets

(51) Int. Cl.
*H04N 13/239* (2018.01)
*H04N 23/611* (2023.01)
*H04N 23/62* (2023.01)

(56) References Cited

U.S. PATENT DOCUMENTS

| | | | |
|---|---|---|---|
| 7,810,750 B2 | 10/2010 | Abreu | |
| 8,159,519 B2 * | 4/2012 | Kurtz | H04N 7/147 348/14.08 |
| 8,902,315 B2 | 12/2014 | Fisher et al. | |
| 9,538,072 B2 | 1/2017 | Stewart et al. | |
| 10,110,805 B2 | 10/2018 | Pomerantz | |
| 10,163,210 B2 | 12/2018 | Kim | |
| 10,389,993 B2 | 8/2019 | MacMillan et al. | |
| 10,924,651 B2 | 2/2021 | Chaudhri et al. | |
| 11,196,863 B2 | 12/2021 | Spohrer | |
| 11,206,325 B1 | 12/2021 | Dennis | |
| 11,431,660 B1 | 8/2022 | Leeds et al. | |
| 11,489,996 B2 | 11/2022 | Burton | |
| 11,523,055 B1 | 12/2022 | Chaudhri et al. | |
| 11,523,243 B2 | 12/2022 | Satongar et al. | |
| 11,567,569 B2 | 1/2023 | Spencer | |
| 11,816,269 B1 | 11/2023 | Chaudhri et al. | |
| 11,899,911 B2 | 2/2024 | Kocienda et al. | |
| 2009/0122161 A1 | 5/2009 | Bolkhovitinov | |
| 2011/0279666 A1 * | 11/2011 | Strombom | A61B 3/113 348/78 |
| 2014/0146153 A1 * | 5/2014 | Birnkrant | H04N 7/18 348/77 |
| 2015/0009550 A1 * | 1/2015 | Misago | G02B 27/0101 359/205.1 |
| 2016/0225192 A1 * | 8/2016 | Jones | G06F 3/017 |
| 2017/0007351 A1 * | 1/2017 | Yu | G02B 27/0172 |
| 2017/0099479 A1 * | 4/2017 | Browd | G06F 3/011 |
| 2017/0181802 A1 * | 6/2017 | Sachs | B25J 9/108 |
| 2017/0322410 A1 * | 11/2017 | Watson | G06T 19/006 |
| 2018/0012413 A1 * | 1/2018 | Jones | G06F 3/0346 |
| 2018/0325498 A1 | 11/2018 | Bongiorno et al. | |
| 2019/0253700 A1 | 8/2019 | Tornéus et al. | |
| 2019/0254754 A1 * | 8/2019 | Johnson | G06T 19/006 |
| 2019/0370532 A1 | 12/2019 | Soni | |
| 2020/0117025 A1 * | 4/2020 | Sauer | G02C 9/00 |
| 2020/0330179 A1 * | 10/2020 | Ton | G02C 7/088 |
| 2021/0067764 A1 * | 3/2021 | Shau | A61B 90/361 |
| 2021/0117680 A1 | 4/2021 | Chaudhri et al. | |
| 2021/0169417 A1 | 6/2021 | Burton | |
| 2023/0280821 A1 | 9/2023 | Kocienda et al. | |
| 2023/0280866 A1 | 9/2023 | Kocienda et al. | |
| 2023/0281254 A1 | 9/2023 | Kocienda et al. | |
| 2023/0281256 A1 | 9/2023 | Kocienda et al. | |
| 2023/0282214 A1 | 9/2023 | Kocienda et al. | |
| 2023/0283705 A1 | 9/2023 | Chaudhri et al. | |
| 2023/0283885 A1 | 9/2023 | Kocienda et al. | |
| 2023/0283886 A1 | 9/2023 | Kocienda et al. | |
| 2023/0327497 A1 | 10/2023 | Chaudhri et al. | |
| 2024/0126363 A1 | 4/2024 | Kocienda et al. | |
| 2024/0155194 A1 | 5/2024 | Kocienda et al. | |
| 2024/0242721 A1 | 7/2024 | Kocienda et al. | |

FOREIGN PATENT DOCUMENTS

| | | |
|---|---|---|
| WO | 2023/168001 A1 | 9/2023 |
| WO | 2023/168071 A1 | 9/2023 |
| WO | 2023/168073 A1 | 9/2023 |
| WO | 2024/118974 A1 | 6/2024 |

OTHER PUBLICATIONS

Donggang Jia et al., "Voice: Visual Oracle For Interaction, Conversation, and Explanation", arXiv:2304.04083v2, Jan. 22, 2024, <https://arxiv.org/abs/2304.04083>, pp. 1-21, retrieved on Jul. 24, 2024 (21 pages).

Ambuj Mehrish et al., "A Review of Deep Learning Techniques for Speech Processing", arXiv:2305.00359v3, May 30, 2023, <https://arxiv.org/pdf/2305.00359>, pp. 1-111, retrieved on Jul. 24, 2024 (111 pages).

Giuseppe Attanasio et al., "Twists, Humps, and Pebbles: Multilingual Speech Recognition Models Exhibit Gender Performance Gaps", arXiv:2402.17954v2, Jun. 19, 2024, <https://arxiv.org/pdf/2402.17954>, retrieved on Jul. 24, 2024 (23 pages).

Konstantinos Tsiakas et al., "Unpacking Human-AI interactions: From interaction primitives to a design space", arXiv:2401.05115v1, Jan. 10, 2024, < https://arxiv.org/abs/2401.05115>, pp. 1-46, retrieved on Jul. 24, 2024 (46 pages).

Pabbathi Sri Charan et al., "Effective Gesture Based Framework for Capturing User Input", arXiv:2208.00913, Aug. 1, 2022, <https://arxiv.org/ftp/arxiv/papers/2208/2208.00913.pdf>, pp. 1-10, retrieved on Jul. 24, 2024 (10 pages).

Chao Chen et al., "Simple calibration method for dual-camera structured light system", Journal of the European Optical Society-Rapid Publications, 14, Article No. 23 (2018), Oct. 26, 2018, <https://doi.org/10.1186/s41476-018-0091-y>, pp. 1-11 pages, retrieved on Jul. 24, 2024 (11 pages).

David Pierce, "Limitless is a new AI tool for your meetings—and an all-hearing wearable gadget", The Verge, Apr. 15, 2024, <https://www.theverge.com/2024/4/15/24130832/limitless-ai-pendant-wearable-meetings> retrieved on Jul. 30, 2024 (8 pages).

* cited by examiner

IMAGE CAPTURING USING A DISPLAY FREE BODY WEARABLE COMPUTING DEVICE

FIELD

Embodiments disclosed herein relate generally to information acquisition. More particularly, embodiments disclosed herein relate to obtaining images of a scene using a display free body wearable computing device.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
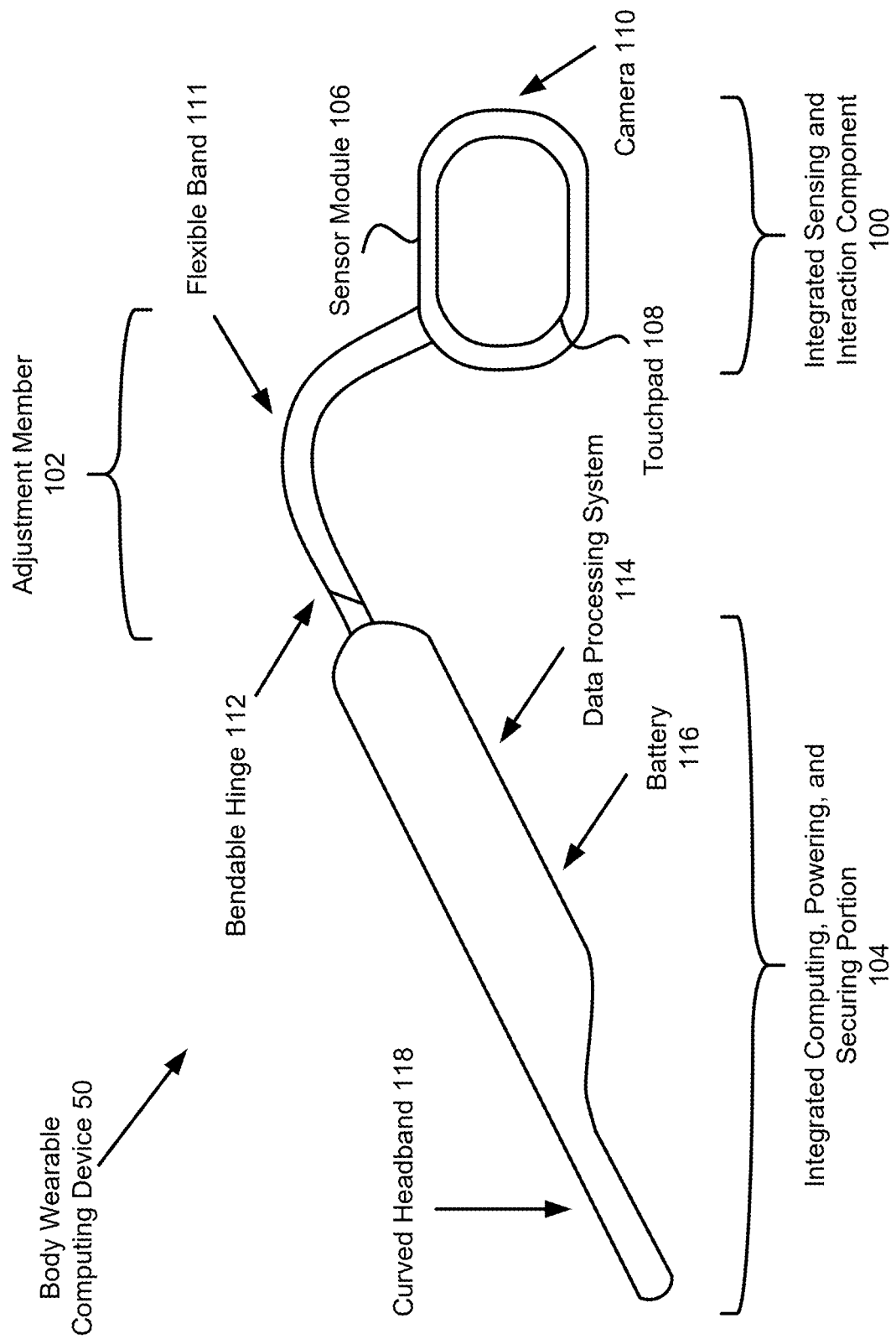
FIG. 1A shows a diagram illustrating a display free body wearable computing device in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for capturing images of a scene using a display free body wearable computing device. The display free body wearable computing device may capture images of a desired portion of the scene based on user input from a user of the display free body wearable computing device.

The display free body wearable computing device may be configured to be worn on a user's head. When worn by the user, the display free body wearable computing device may provide computer-implemented services by interacting with the user.

The display free body wearable computing device may include sensors (e.g., cameras, a microphone array, etc.) that may obtain user input. The user input may include, for example, voice commands, recognizable gestures (e.g., pointing gestures, framing gestures, etc.), and/or any other input that may indicate a request for an image of the desired portion of the scene. The display free body wearable computing device may identify the portion of the scene that the user may wish to capture by interpreting the user input.

The display free body wearable computing device may interpret the user input by using a guidance image to identify an object and/or portion of the scene that may be of interest to the user. To do so, the display free body wearable computing device may perform actions that may include, for example, object segmentation, parallax correction, and/or any other actions to identify a desired portion of the scene.

Once identified, the desired portion of the scene may be captured as a stereo image by at least two image sensors (e.g., a pair of cameras of the display free body wearable computing device that may be positioned between eyes and ears of the user). Once captured, the stereo image may be processed by a data processing system of the display free body wearable computing device to obtain an image of the scene.

Thus, embodiments disclosed herein may provide an improved method for capturing images of a scene using a display free body wearable computing device by interpreting user input to identify a desired portion of the scene. By doing so, an image of the desired portion of the scene may be provided to a user of the display free body wearable computing device.

In an embodiment, a method for capturing images of a scene using a display free body wearable computing device is provided. The method may include: (i) obtaining, using at least one sensor of the display free body wearable computing device, at least one portion of user input; (ii) interpreting the at least one portion of user input to identify a portion of the scene that the user wishes to capture in an image of the images; (iii) obtaining, using at least two image sensors of the display free body wearable computing device, a stereo image depicting at least the portion of the scene; and (iv) combining the stereo image to obtain the image.

Obtaining the at least one portion of user input may include: obtaining, using a microphone array of the at least one sensor, a voice command from the user.

Obtaining the at least one portion of user input may include: obtaining, using at least one of the at least two image sensors, a guidance image depicting a portion of the scene and a portion of the user of the display free body wearable computing device.

Interpreting the at least one portion of user input may include: identifying, using the guidance image, an object depicted in the scene that is of interest to the user.

Obtaining the stereo image may include: (i) directing, to obtain a desirable field of view for the at least two image sensors, movement of the user to: (a) remove the portion of the user from a field of view of the at least two image sensors, and (b) retain the object in the field of view; (ii) while the desirable field of view is present, activating the at least two image sensors to capture the stereo image.

The portion of the user may depict a recognizable gesture.

The recognizable gesture may be a pointing gesture used by the user to convey interest in an object in the scene to the display free body wearable computing device.

The recognizable gesture may be a framing gesture used by the user to convey interest in a portion of the scene.

The method may further include: (i) identifying a distance between the portion of the user and the at least two image sensors; and (ii) performing, using the distance and the guidance image, parallax collection to identify the portion of the scene.

The display free body wearable computing device may include: (i) an integrated sensing and interaction component adapted to: (a) be positioned symmetrically on two portions of a user's head, (b) be positioned between ears and eyes of the user, and (c) capture a stereo image of at least a portion of a scene present in a field of view of the user; (ii) an integrated computing, powering, and securing portion; and (iii) an adjustment member adapted to position the integrated sensing and interaction component with respect to the integrated computing, powering, and securing portion.

The integrated sensing and interaction component may include: (i) a pair of cameras; (ii) speakers; (iii) a microphone array; and (iv) a touch pad.

The integrated sensing and interaction component may be adapted to: (i) obtain the stereo image from the pair of cameras; (ii) at least partially process the stereo image to obtain an image processing result; (iii) identify an action to be performed based, at least in part, on the image processing result and a derived result from a remote entity, the derived result being based, at least in part, on the stereo image and/or the image processing result; and (iv) use at least the speakers to perform the action.

The pair of cameras may comprise lenses configured to: (i) establish a camera line of sight that is parallel to a line of sight of the user; and (ii) establish a camera field of view that comprises the field of view of the user.

The stereo image may include a pair of images of the scene, each of the images being captured at different angles and/or positions with respect to the scene by the pair of cameras.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1A, various types of computing devices may provide computer implemented services. The various types of computing devices may include, for example, desktop computers, laptop computers, cell phones, and/or other types of computing devices.

Such computing devices may provide any number and types of computer-implemented services (e.g., to a user of the computing device and/or devices operably connected to the computing device). The computer-implemented services may include, for example, data acquisition services, communication services, and/or other types of services that may be relevant to user and/or other devices.

However, the ability to provide such services may be limited based on the information available to the computing devices. For example, a desktop computer may be positioned under a desk, or in other locations. Consequently, the desktop computer may have a very limited capability to gather information regarding the environment in which it resides.

Accordingly, due to the limited information, the types and quality of computer implemented services may be limited. Returning to the desktop computer example, such desktop computers may lack native ability to capture images and/or audio of scenes that are relevant to a user of the desktop computer. Thus, the desktop computer may lack the ability to provide some types of services that are relevant to a user.

In general, embodiments disclosed herein relate to systems, methods, and devices for providing computer implemented services that are of relevance to users. To provide the computer implemented services, a display free body wearable computing device may be utilized. For example, display free body wearable computing device 50 may be adapted to be worn by a user. When worn by a user, the body wearable computing device may be able to gather information that is more relevant to users for use in providing computer-implemented services.

The computer-implemented services may include, for example, capturing images of at least a portion of a scene desired by a user using display free body wearable computing device 50. To capture the images of the at least a portion of the scene desired by a user, user input may be obtained by display free body wearable computing device 50. The user input may include, for example, voice commands, recognizable gestures (e.g., pointing gestures, framing gestures, etc.), and/or any other input that may indicate a request for an image of the desired portion of the scene.

Display free body wearable computing device 50 may interpret the user input by obtaining and using a guidance image to identify an object and/or portion of the scene that may be of interest to the user. Once identified, display free body wearable computing device 50 may capture, using cameras of display free body wearable computing device 50, images of the portion of the scene desired by the user and that is likely to include the more relevant information. Therefore, through use of this more relevant information, the display free body wearable computing device may be more likely to provide computer-implemented services that are of higher relevancy to users.

To provide the computer-implemented services to the user of body wearable computing device 50, display free body wearable computing device 50 may include: (i) integrated sensing and interaction component 100, (ii) adjustment member 102, and (iii) integrated computing, powering, and securing portion 104. Each of these components is discussed below.

Integrated sensing and interaction component 100 may provide input/output services to the user. To do so, integrated sensing and interaction component 100 may host sensors module 106, touchpad 108, camera 110, and/or any other components. To host the components, integrated sensing and interaction component 100 may include a pair of enclosures (e.g., 3-dimensional bubble-shaped housings that may be at least partially transparent) adapted to be positioned symmetrically on both sides of the user's head, between ears and eyes of the user (e.g., proximate to temples of the user). When worn, integrated sensing and interaction component 100 may operate, for example, without covering the user's ear and extending past the user's eyes. By being positioned as such, the body wearable computing device may be worn and used to interact with the user without obstructing facial features (e.g., eyes, ears, etc.) of the user.

Integrated sensing and interaction component 100 may obtain inputs from any number of sensors to identify actions to be performed. For example, integrated sensing and interaction component 100 may obtain guidance image using camera 110 and at least partially process the guidance image to obtain an image processing result. The guidance image may depict a portion of the scene and a portion of the user (e.g., one or more of the user's hands) of display free body wearable computing device 50. Integrated sensing and interaction component 100 may identify a recognizable gesture (e.g., a pointing gesture, framing gesture, etc.) from the guidance image that may trigger an action set for capturing an image. Integrated sensing and interaction component 100 may also obtain and use audio inputs (e.g., voice commands) for use in identifying actions sets for capturing an image, individually and/or cooperatively with visual inputs (e.g., the guidance image).

For example, consider a scenario in which a user raises a hand to point at car while issuing a voice command to take a picture. Integrated sensing and interaction component 100 may identify the user's hand as a pointing gesture and/or identify the voice command issued by the user. Integrated sensing and interaction component 100 and/or any other entities (e.g., data processing system 114, remote entities, etc.) may subsequently identify an action set based on the gesture and/or the voice command. The action set may include, for example, audio instructions using speakers of integrated sensing and interaction component 100 to direct the user to remove the user's hand from a field of view while retaining the car in the field of view, activating image sensors of camera 110 to capture a stereo image, combining the stereo image, and/or any other actions.

Touchpad 108 may be used to receive tactile input. For example, a user may provide input by using one or more fingers to touch, press, any/or perform any other actions using touchpad 108. The input may be used, for example, to trigger actions, provide information to the display free body wearable computing device for use in providing computer-implemented services, and/or any other use cases. To improve ease of use, touchpad 108 may be affixed to a lateral side of integrated sensing and interaction component 100 away from the user's head when worn. Touchpad 108 may be included on either or both enclosures of integrated sensing and interaction component 100.

Sensor module 106 may provide at least a portion of the input/output services provided by integrated sensing and interaction component 100. To do so, sensors module 106 may include any number and/or type of sensors. For example, sensors module 106 may include speakers and a microphone array. The microphone array of sensor module may obtain, for example, a voice command from the user. Integrated sensing and interaction component 100 may process the voice command to trigger an action set to capture an image of the scene. Sensor module 106 may also provide audio output (e.g., via the speakers). The audio output may include, for example, instructions to direct movement of a portion of the user while capturing an image, information regarding a status of the images captured, and/or any other information.

Camera 110 may capture images. The images captured by camera 110 may include stereo images of at least a portion of a scene present in a field of view of the user. The stereo images may include a pair of images of the scene, each of the images being captured at different angle and/or positions (e.g., different viewpoints) with respect to the scene by camera 110.

To do so, camera 110 may include a pair of cameras that may each be positioned inside an enclosure of the pair of enclosures of integrated sensing and interaction component 100 on both sides of the user's head between eyes and ears of the user. Furthermore, camera 110 may be pointed in a direction generally aligned with a direction that the user's eyes may be pointed. By being positioned as such, camera 110 may be configured to establish a camera line of sight that is parallel to a line of sight of the user, and a camera field of view that include the field of view of the user. Refer to FIGS. 1C-1D for additional details regarding the camera field of view and the camera line of sight relative to the user.

Camera 110 may configure image capturing settings (e.g., focus, zoom, etc.) based on information obtained by integrated sensing and interaction component 100 and/or any other components of display free body wearable computing device 50 (e.g., data processing system 114).

Adjustment member 102 may at least partially secure display free body wearable computing device 50 to the user's head and be adapted to position integrated sensing and interaction component 100 with respect to integrated computing, powering, and securing portion 104. To do so, adjustment member may include flexible band 111 and bendable hinge 112.

Flexible band 111 may be configured in a shape (e.g., a curved shape) that may enable adjustment member 102 to rest on an ear of the user while display free body wearable computing device 50 is used by the user. Furthermore, flexible band 111 (e.g., the shape of flexible band 111) may be modified (e.g., via bending) to improve comfort and/or fit of display free body wearable computing device 50 while used by the user.

Bendable hinge 112 may enable repositioning of integrated sensing and interaction component 100 with respect to integrated computing, powering, and securing portion 104. For example, when bendable hinge 112 is in a first state (e.g., not bent), integrated computing, powering, and securing portion 104 may be configured to be positioned around the back of the user's head while integrated sensing and interaction component 100 is positioned between ears and eyes of the user. Alternatively, when bendable hinge 112 is in a second state (e.g., bent at a certain angle), integrated computing, powering, and securing portion 104 may be configured to be positioned around the top of the user's head while integrated sensing and interaction component 100 is positioned between ears and eyes of the user.

Integrated computing, power, and securing portion 104 may provide at least a portion of the computer-implemented services and may at least partially secure display free body wearable computing device 50 to the user. To do so, integrated computing, powering, and securing portion 104 may include an enclosure that includes: (i) data processing system 114, (ii) battery 116, and (iii) curved headband 118.

Data processing system 114 may provide computer-implemented services based on inputs (e.g., stereo images, audio inputs, etc.) obtained from integrated sensing and interaction component 100. To do so, data processing system 114 may host any quantity of hardware resources that may include, for example, a processor operably coupled to memory, storage, and/or other hardware components (e.g., sensors of integrated sensing and interaction component 100). Data processing system 114 may facilitate performance of actions requested by a user of display free body wearable computing device 50 (e.g., independently and/or cooperatively with remote entities that may provide a second portion of computer-implemented services).

Using the hosted hardware resources and/or applications supported by the hardware resources, data processing system 114 may provide services relevant to images, audio, text, decision making, and/or any other capabilities. For example, data processing system 114 may perform operations relevant to the service and/or data processing system 114 may communicate with remote entities using a network stack hosted by hardware resources of data processing system 114.

To provide services relevant to images (e.g., pictures, video, etc.), data processing system 114 may obtain image data from one or more cameras of camera 110. The image data may be used to identify user inputs (e.g., hand gestures) that may indicate requests for actions to be performed by the body wearable computing device. Data processing system 114 may subsequently make decisions to handle the requests based on the user input. Additionally, data processing system 114 may perform image stitching using a stereo image of the image data to obtain a unified image of a portion of a scene present in a field of view of the user. Data processing system 114 may process and/or perform actions based on derived information from the unified image.

To handle the requests based on the user inputs for decision making, data processing system 114 may utilize hardware and/or software adapted to process the user inputs. For example, data processing system 114 may use a tactile input handling application to make decisions (e.g., perform an action set, communicate information, etc.) based on tactile input received from touchpad 108.

Additionally, data processing system 114 may perform services based on audio input received from a microphone array of sensor module 106 that may include, for example, transcription, speaker segmentation, and/or any other service. To do so, data processing system 114 may, for example, host applications adapted to interpret conversations, recognize speech, convert speech to text, and/or perform any other operations. Data processing system 114 may similarly make decisions based on information obtained from the audio input.

To communicate results of the services to the user of the body wearable computing device, data processing system 114 may send information to be output from speakers of sensor module 106. To do so, data processing system 114 may utilize hardware and/or software to transmit the information to the speakers. For example, an application may convert text results obtained from the audio and/or image services, as discussed above, to an audio output format that may be communicated to the user.

Consider a scenario in which the unified image includes the user's hands and a sign with words written in a certain language. Data processing system 114 and/or integrated sensing and interaction component 100 may recognize hand gestures performed by the user's hands that may indicate a request for display free body wearable computing device 50 to translate and/or dictate a phrase written on the sign. Data processing system 114 may subsequently communicate the image and/or information from the image to any number and/or type of remote entities (e.g., cloud services, remote artificial intelligence platforms, etc.) that may provide additional services that may provide requested information/results to data processing system 114. Data processing system 114 may then provide instructions to integrated sensing and interaction component 100 to dictate (e.g., using speakers) the requested information.

Battery 116 may supply electrical power to data processing system 114, components of integrated sensing and interaction component 100, and/or any other entities. To do so, battery 116 may obtain and/or store electrical power provisioned by an external power source. The electrical power may subsequently be provided to components of display free body wearable computing device 50 that may request the electrical power for operation.

Curved headband 118 may connect two portions of the body wearable computing device. For example, curved headband may be configured in a curved shape and be adapted to connect a first side of display free body wearable computing device 50 (e.g., including a first portion of integrated sensing and interaction component 100, adjustment member 102, etc.) that may be positioned on the first side of the user's head to a second side of display free body wearable computing device 50 that may be positioned on the second side of the user's head.

While illustrated in FIG. 1A with a limited number of specific components, a system may include additional, fewer, and/or different components without departing from embodiments disclosed herein.

Thus, as shown in FIG. 1A, display free body wearable computing device 50 may provide computer-implemented services to a user using components adapted to capture images of a portion of a scene desired by the user.

Figure 1B:
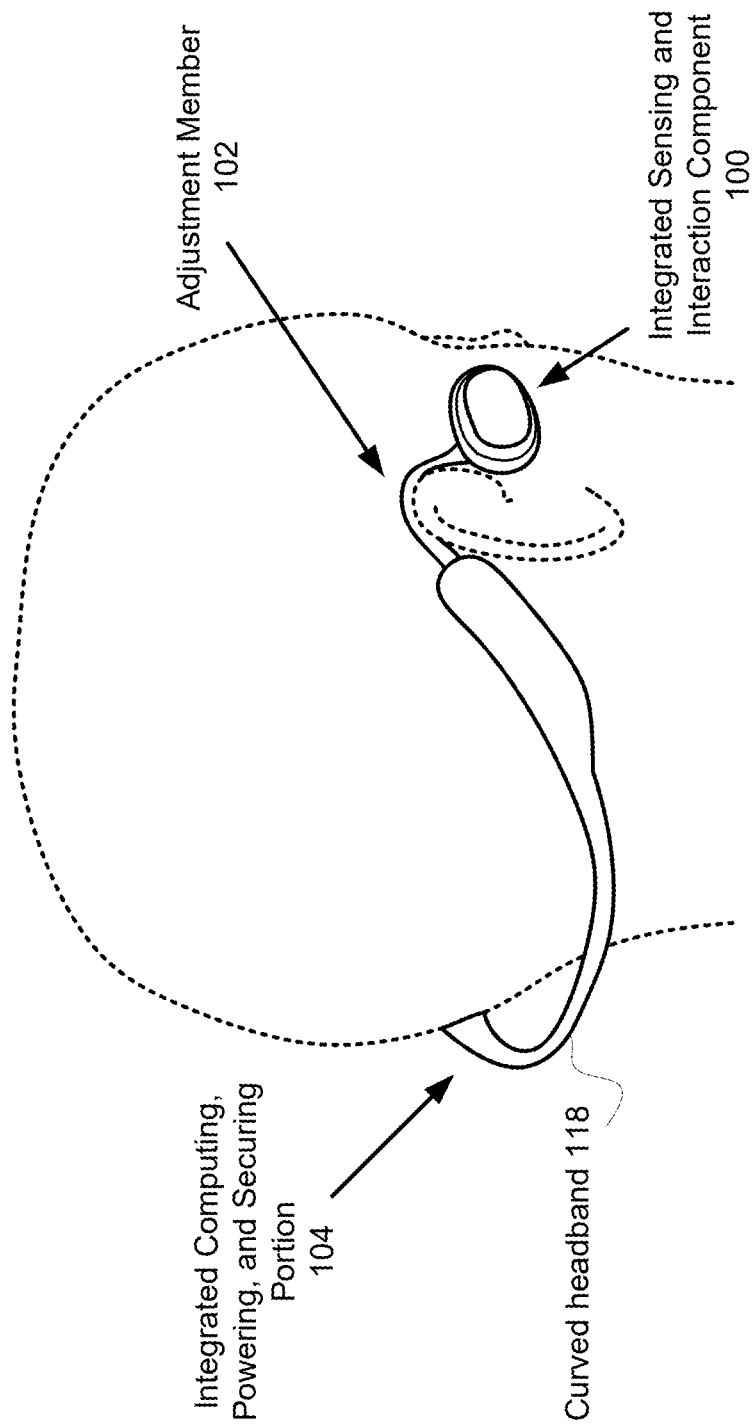
FIGS. 1B-1D show diagrams illustrating alternative views of the display free body wearable computing device in accordance with an embodiment.
Figure 1C:
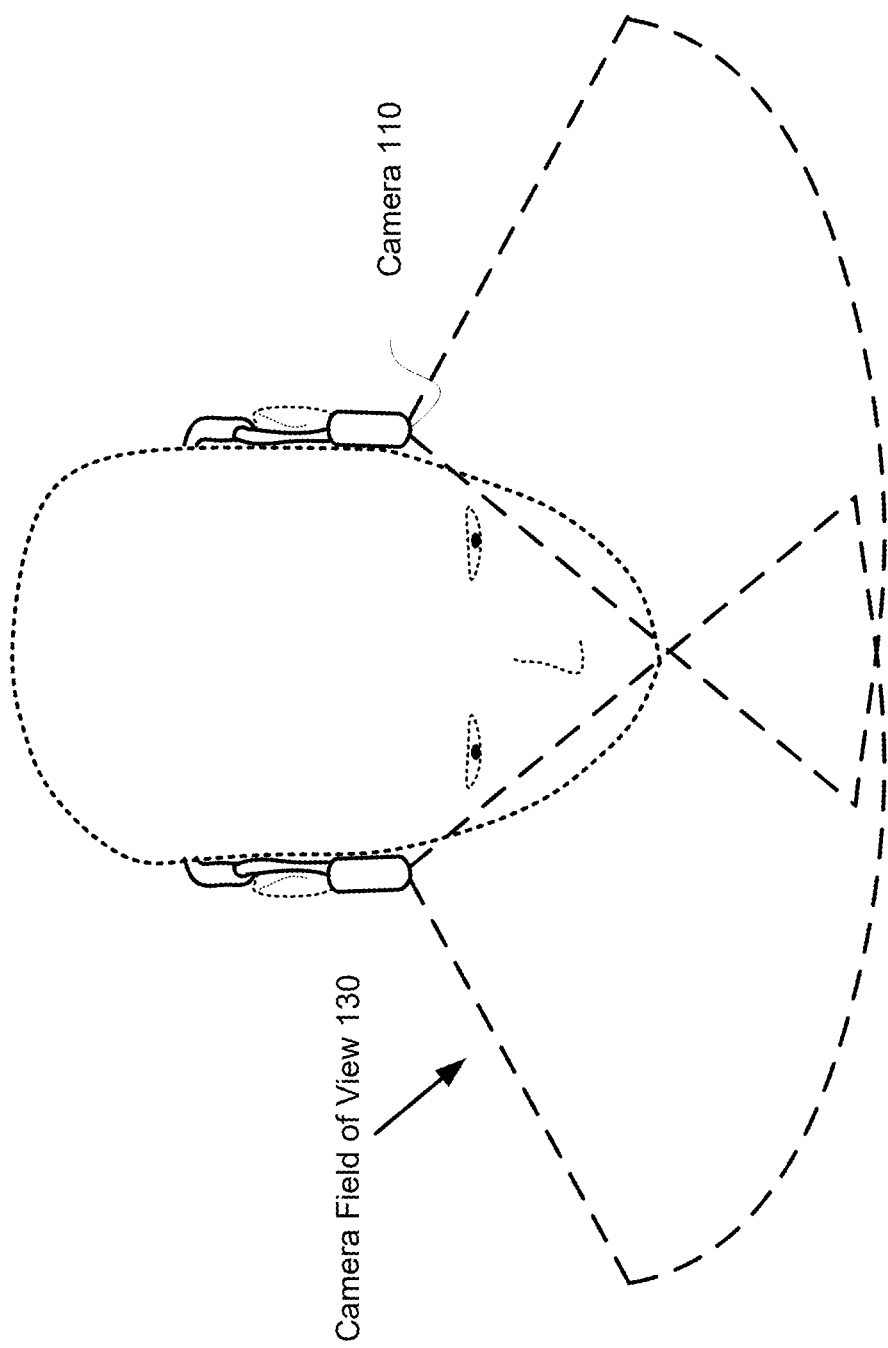
Figure 1D:
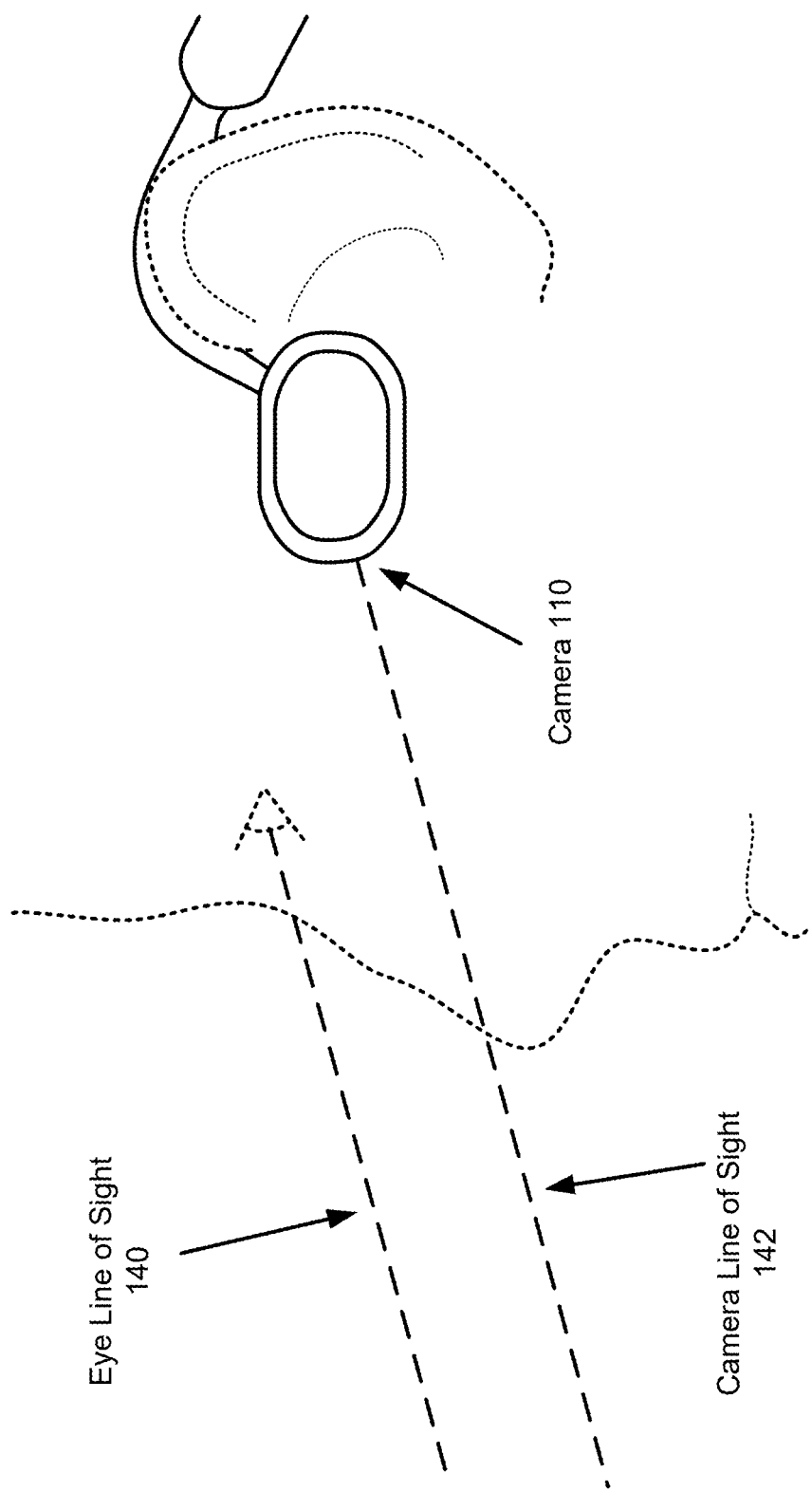

Turning to FIG. 1B, an alternate view of display free body wearable computing device 50 in accordance with an embodiment is shown.

In FIG. 1B, display free body wearable computing device 50 may be illustrated while worn by a user (drawn in short-dashed outline). As shown in FIG. 1B, a portion of integrated sensing and interaction component 100 of display free body wearable computing device 50 is positioned on a first side of the user's head between an eye and an ear of the user while a portion of adjustment member 102 rests on the ear of the user. While not shown, it may be appreciated that a second portion of integrated sensing and interaction component 100 and a second portion of adjustment member 102 may be similarly positioned on a second side of the user's head.

Integrated computing, powering, and securing portion 104 and curved headband 118 of integrated computing, powering, and securing portion 104 may connect the first portions and second portions of adjustment member 102 and integrated sensing and interaction component 100. To do so, curved headband 118 may wrap around the back of the user's head, as shown, while adjustment member 102 is in a first configuration (e.g., not bent). While not shown, it may be appreciated that curved headband 118 and integrated computing, powering, and securing portion 104 may be positioned around the top of the user's head and/or any other position when adjustment member 102 is in a second configuration.

Turning to FIG. 1C, a second alternate view of display free body wearable computing device 50 in accordance with an embodiment is shown. The second alternate view of display free body wearable computing device 50 may include a top-down view of display free body wearable computing device 50 while worn by a user (drawn in short-dashed outline) and may illustrate a camera field of view established by camera 110 (drawn in long-dashed outline).

Camera 110 of integrated sensing and interaction component 100 may, as discussed above, include a pair of cameras positioned on both sides of the user's head between eyes and ears of the user and may be pointed in a direction generally aligned with a direction that the user is facing. Each camera of the pair of cameras may include lens and a sensor that may be configured to establish a portion of camera field of view 130. Camera field of view 130 may include an angular measurement that may indicate a viewable area that may be captured by the camera.

Camera field of view 130 may be established based on the lens (e.g., a focal length of the lens) and/or the sensor (e.g., a size of the sensor) of camera 110. Each camera of the pair of cameras of camera 110 may establish a portion of camera field of view 130 that may each capture a portion of a scene at different angles and/or positions with respect to the scene by the pair of cameras.

For example, consider a scenario in which camera field of view 130 is configured by camera 110 to be 120 degrees of horizontal view. Each camera of the pair of cameras of display free body wearable computing device 50 may capture an image based on the 120 degrees of the scene present in a field of view of the user. When aggregated (e.g., used together), a field of view of the images exceed a field of field of the user. The field of view of the user may include, for example, 120 degrees of viewable area based on binocular vision (e.g., a single image perceived from a pair of images view by a pair of eyes) of the user. The pair of cameras of camera 110 may similarly capture a stereo image that may include a pair of images of the portion of the scene present in the field of view of the user at the different angles and/or positions.

The stereo image may be processed (e.g., via image stitching, aggregation, etc.) by integrated sensing and interaction component 100, data processing system 114, and/or any other entities to generate a resulting image that may include at least the portion of the scene present in the field of view of the user (e.g., a greater field of view when compared to the user's field of view based on the user's binocular vision). The resulting image may subsequently provide information (e.g., additional information that the user may not obtain based on a field of view of the user's eyes) relevant to providing computer-implemented services to the user.

Thus, as shown in FIG. 1C, camera 110 of display free body wearable computing device 50 may be adapted to capture images of at least a portion of the scene present in a user's field of view. The images may provide visual information usable to perform desired actions by display free body wearable computing device 50 for the user.

Turning to FIG. 1D, a third alternate view of display free body wearable computing device 50 in accordance with an embodiment is shown. The third alternate view of display free body wearable computing device 50 may include a side view of display free body wearable computing device 50 while worn by a user and may illustrate a camera line of sight established by camera 110.

Camera 110 may, as discussed above, include a pair of cameras positioned on both sides of the user's head between eyes and ears of the user and may be pointed in a direction generally aligned with a direction that the user is facing. Each camera of the pair of cameras may include lens and a sensor that may be configured to establish camera line of sight 142 that may be parallel to eye line of sight 140 of the user.

Camera line of sight 142 may enable camera 110 to capture images based on a vertical field of view that may be generally aligned with a vertical field of view of the user's eyes. The vertical field of view may be established, for example, by configuring cameras 110 (e.g., in a portrait orientation) to capture a vertical field of view that may include a vertical field of view of the user's eyes. By doing so, camera 110 may capture images of arm/hand movements and/or gestures when performed by the user.

Thus, as shown in FIG. 1D, cameras of display free body wearable computing device 50 may be adapted to capture images that may enable a user to interact with display free body wearable computing device 50 based on the user's line of sight.

Figure 2:
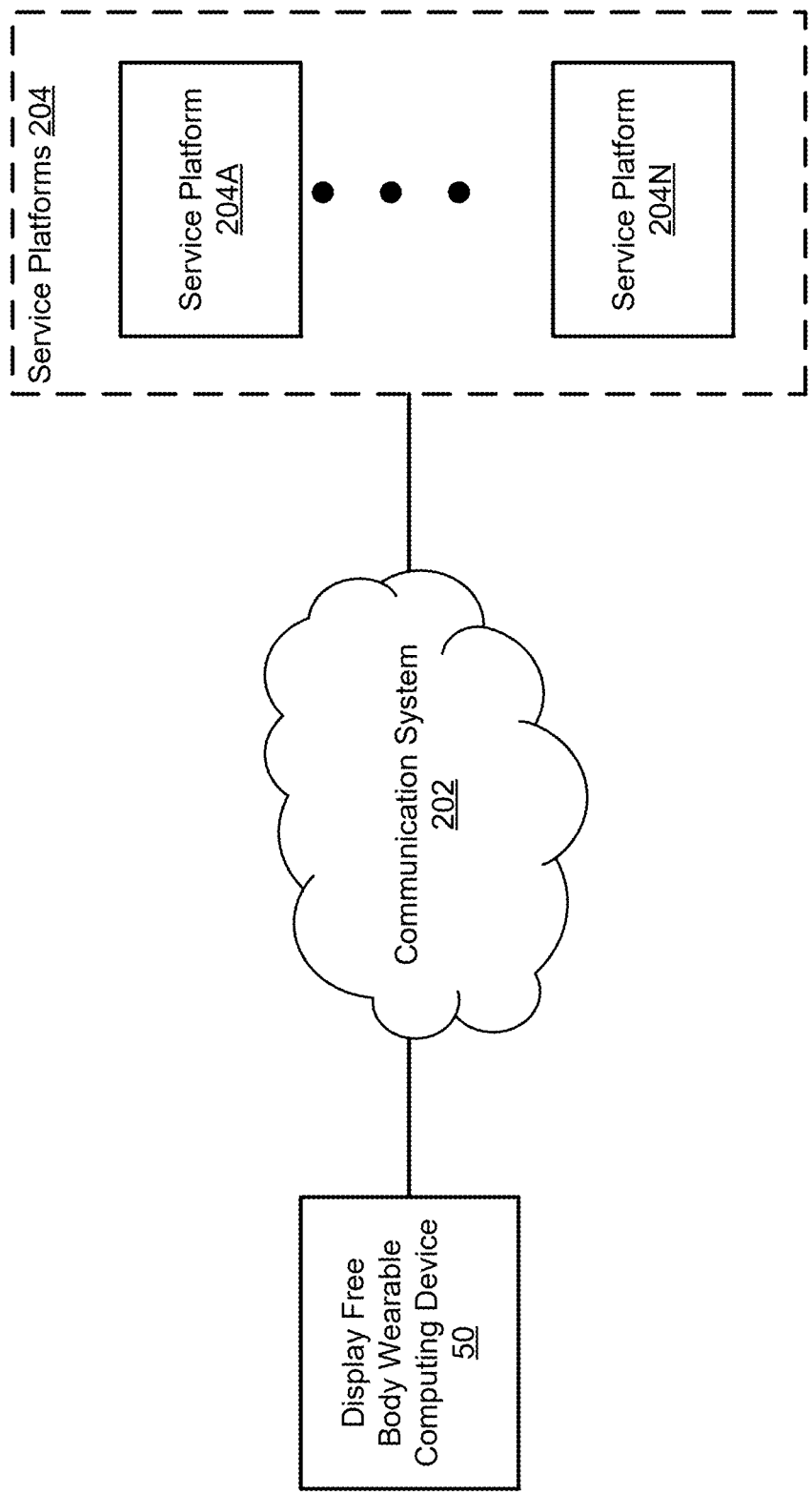
FIG. 2 shows a diagram illustrating a system in accordance with an embodiment.

Turning to FIG. 2, a block diagram in accordance with an embodiment is shown. The block diagram may illustrate a system used in providing computing-implemented services by the display free body wearable computing device.

Display free body wearable computing device 50 may, as previously discussed, provide computer-implemented services to a user. While providing the computer-implemented services, display free body wearable computing device 50 may interact with service platforms 204 to obtain information relevant to the computer-implemented services provided to the user.

Service platforms 204 may, as discussed above, provide remote computing services. Service platforms 204 may include any number and/or type of service platforms that may individually and/or cooperatively perform services requested by display free body wearable computing device 50. Service platforms 204 may include, for example, cloud services (e.g., image storage, speech-to-text, large language model, etc.), artificial intelligence platforms (e.g., generative artificial intelligence), and/or any other remote service platforms. Service platforms 204 may provide information based at least in part on input obtained from display free body wearable computing device 50.

For example, consider a scenario in which a user, while wearing display free body wearable computing device 50, may be looking at a bird perched on a tree in a forest. Display free body wearable computing device 50 may obtain a request (e.g., via a voice command captured by a microphone array of display free body wearable computing device 50, a gesture captured by cameras of from display free body wearable computing device 50, etc.) from the user indicating a desire for a picture of the bird. Display free body wearable computing device 50 may: (i) obtain data that may include an image of the scene, (ii) pre-process the data (e.g., focus the image on the bird, stitch images from a plurality of images captured by cameras of display free body wearable computing device 50, etc.) to obtain a unified image, (iii) communicate the unified image to a service platform (e.g., 204A) of service platforms 204, and/or perform any other actions. Service platform 204A may perform, for example, object recognition services, information search services, and/or any other services to capture the desired image based on the unified image provided by display free body wearable computing device 50. Service platform 204A and/or a second service platform (e.g., service platform 204B) may store the desired image in an image storage service for subsequent retrieval by a user of display free body wearable computing device 50.

Consider a second scenario in which a user of display free body wearable computing device 50 desires to generate a three-dimensional (3D) interactive model of a room that the user is present. Once a request for the 3D interactive model is identified, body wearable computing device 50 may: (i) provide instruction to the user (e.g., to move around the room), (ii) capture images using the camera at a certain frequency (e.g., while the user is moving around the room), and/or perform any other actions. Display free body wearable computing device 50 may provide the captured images along with metadata regarding each of the captured images to a second service platform (e.g., 204B) of service platforms 204. Using image data provided by display free body wearable computing device 50, service platform 204B may perform, for example, 3D rendering services, video editing services, video storage services, and/or any other services to generate the video desired by the user. Display free body wearable computing device 50 may subsequently communicate a status (e.g., completion, instructions for access, etc.) of the desired 3D interactive model to the user.

Communication system 202 may allow any of body wearable computing device 50 and service platforms 204 to communicate with one another (and/or with other devices not illustrated in FIG. 2). To provide its functionality, communication system 202 may be implemented with one or more wired and/or wireless networks. Any of these networks may be a private network (e.g., the "Network" shown in FIG. 5), a public network, a virtual network (e.g., a virtual private network), and/or may include the Internet. For example, body wearable computing device 50 may be operably connected to service platforms 204 via the Internet, a private network, etc. Body wearable computing device 50 and service platforms 204 may be adapted to perform one or more protocols for communicating via communication system 202.

As discussed above, the components of FIG. 1A may perform various methods to capture images of a scene using a display free body wearable computing device. FIGS. 3A-3D illustrate methods that may be performed by the components of the system of FIG. 1A. In the diagrams discussed below and shown in FIGS. 3A-3D, any of the operations may be repeated, performed in different orders, and/or performed in parallel with or in a partially overlapping in time manner with other operations.

Figure 3A:
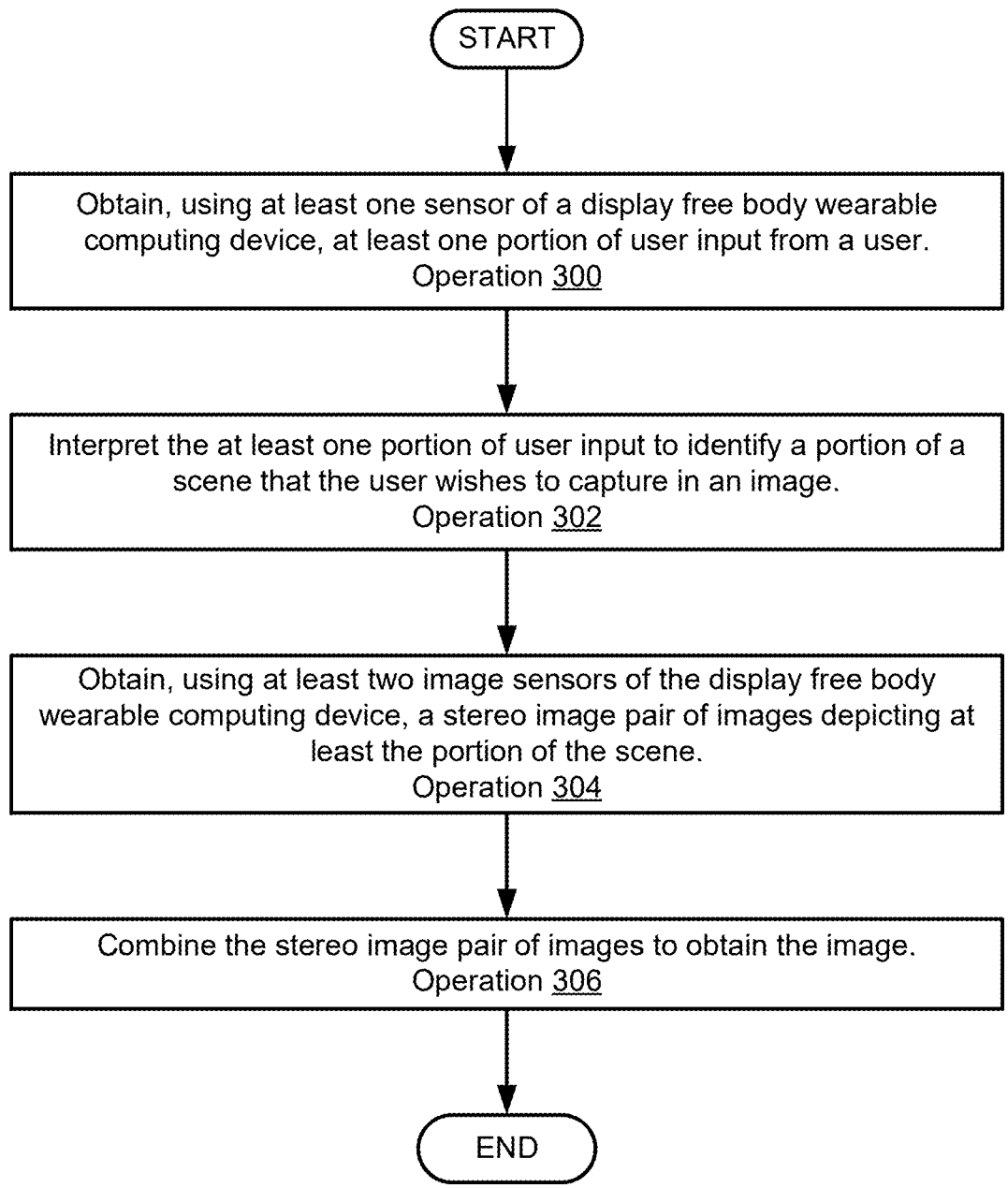
FIGS. 3A-3D show flow diagrams illustrating methods in accordance with an embodiment.

Turning to FIG. 3A, a first flow diagram illustrating a method of capturing an image of a scene using the display free body wearable computing device in accordance with an embodiment is shown. The method may be performed, for example, by any of the components of the system of FIG. 1A, and/or other components not shown therein.

Figure 3B:
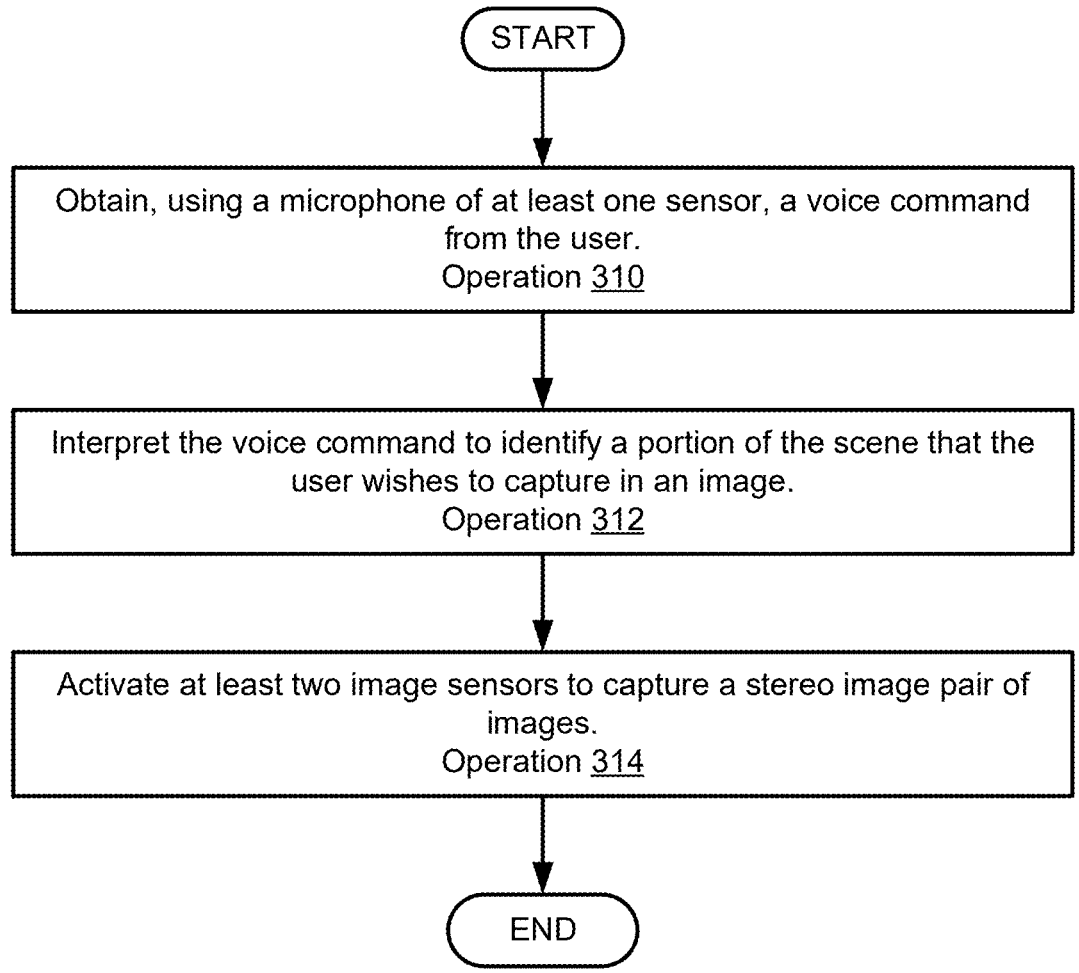
Figure 3C:
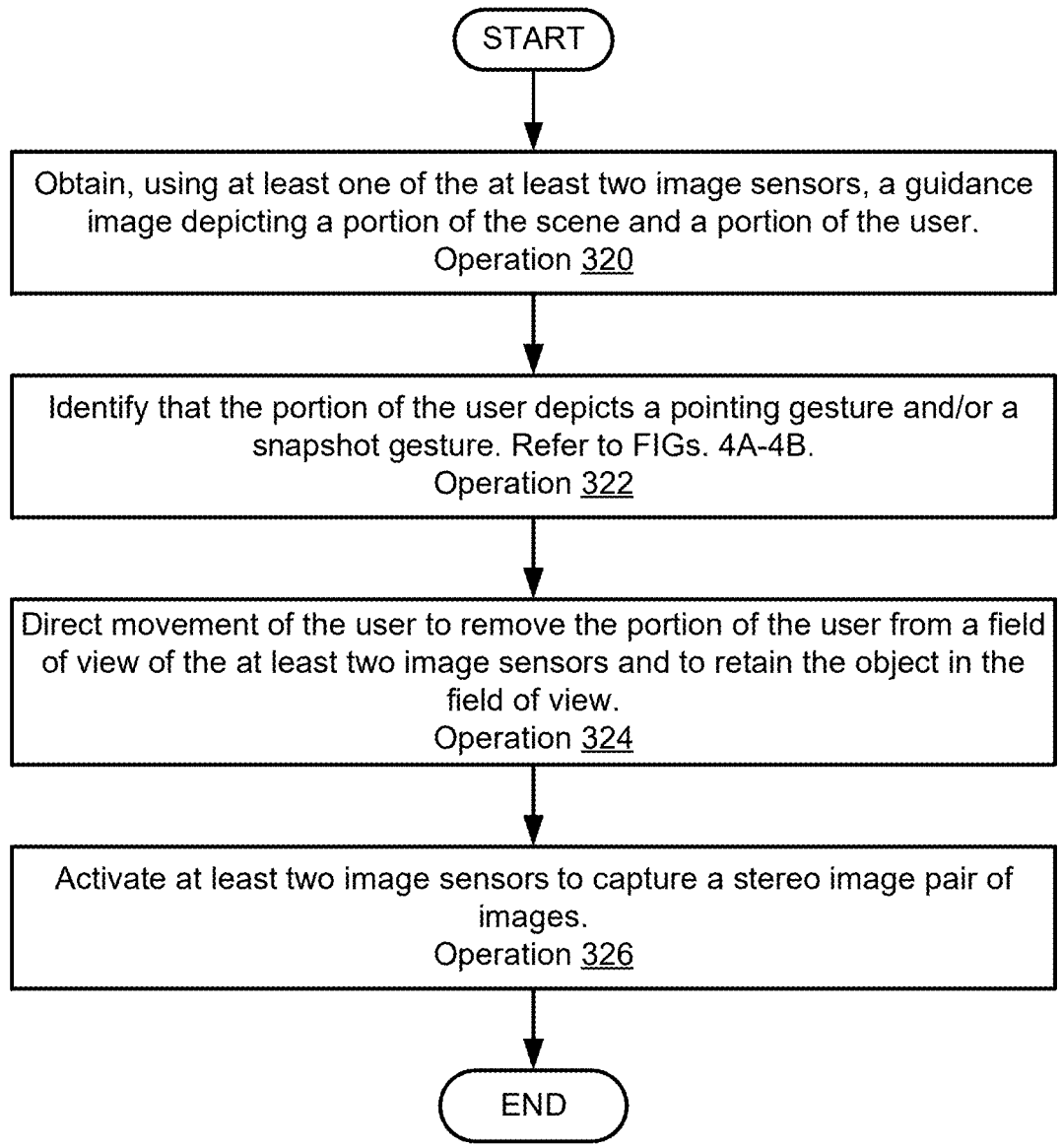
Figure 3D:
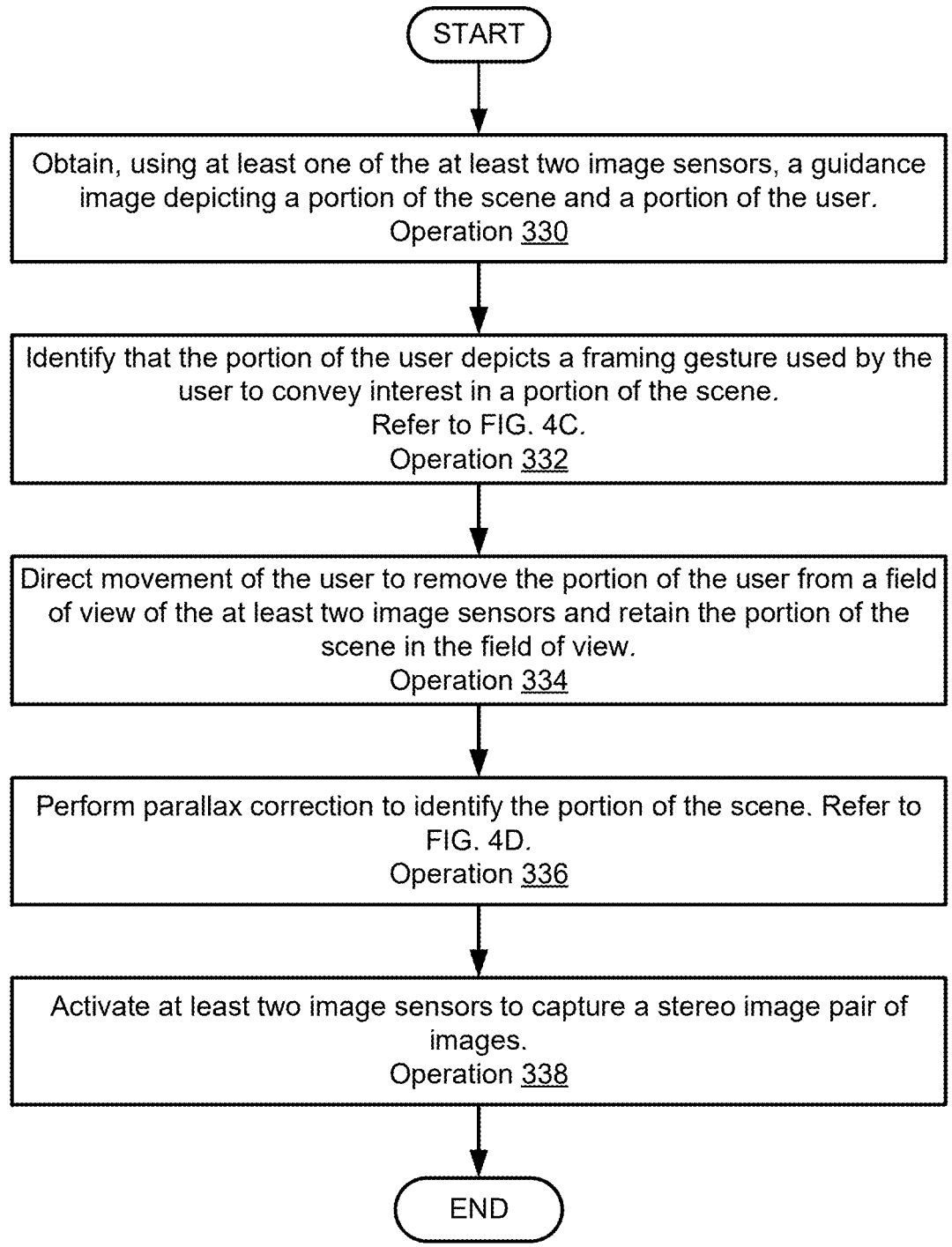

At operation 300, at least one portion of user input may be obtained from a user of the display free body wearable computing device. The at least one portion of user input may be obtained by: (i) obtaining a voice command from the user, (ii) obtaining a guidance image depicting a portion of the scene and a portion of the user, (iii) obtaining tactile input from the user, and/or any other processes. Refer to FIGS. 3B-3D for additional details.

At operation 302, the at least one portion of user input may be interpreted to identify a portion of a scene that the user wishes to capture in an image. The at least one portion of user input may be interpreted by: (i) obtaining a guidance image, (ii) analyzing a voice command obtained from the user, (iii) identifying a gesture performed by the user from the guidance image, (iv) performing operations on the guidance image to identify a portion of a scene (e.g., an object of interest) depicted in the guidance image that the user wishes to capture an image of based on the user input, and/or any other processes. Refer to FIGS. 3B-3D for additional details.

At operation 304, a stereo image depicting at least the portion of the scene may be obtained. The stereo image may be obtained by: (i) providing instructions to at least two image sensors (e.g., cameras) of the display free body wearable computing device to capture any number of images, (ii) composing an image capture by each camera of a pair of cameras (e.g., focusing on an object of interest, framing a shot, adjusting shutter speed, arranging elements of the portion of the scene, etc.), (iii) executing the image capture instruction, (iv) storing the image data, and/or performing any other actions.

At operation 306, the stereo image may be combined to obtain the image. The stereo image may be combined by: (i) performing post-processing on each image of the stereo image (e.g., comparing and selecting an image of images based on criteria, adjusting properties of the image to improve a quality of the image, etc.), (ii) merging the stereo image based on cues of the stereo image (e.g., relative distances, depth, overlapping elements, etc.), (iii) obtaining an unified image depicting the portion of the scene, and/or any other processes.

The method may end following operation 306.

Using the method shown in FIG. 3A, an image of a portion of a scene may be captured by a display free body wearable computing device based on at least one portion of user input from a user of the display free body wearable computing device. By doing so, a quality of computer-implemented services provided by the display free body wearable computing device using the captured image may be improved.

Turning to FIG. 3B, a second flow diagram illustrating a method of capturing a stereo image based on a user input of a voice command in accordance with an embodiment is shown. The method may be performed, for example, by any of the components of the system of FIG. 1A, and/or other components not shown therein.

At operation 310, a voice command from the user may be obtained. The voice command may be obtained by: (i) monitoring, by a microphone array of the at least one sensor, sound of an environment that the display free body wearable computing device is present, (ii) processing the sound (e.g., identifying speech, converting the speech to text, etc.) to obtain speech input, (iii) identifying that the speech input was issued by the user of the display free body wearable computing device (e.g., based on tonality, speech patterns, etc.), and/or any other process.

At operation 312, the voice command may be interpreted to identify a portion of the scene that the user wishes to capture in an image. The voice command may be interpreted by: (i) matching a portion of speech input from the voice command to a set of rules (e.g., predetermined words and/or phrases), (ii) identifying that the voice command may indicate a request for image capture based on the matching, and/or performing any other actions.

At operation 314, at least two image sensors may be activated to capture a stereo image. The at least two image sensors may be activated by: (i) providing instructions to each of the at least two image sensors (e.g., cameras) to capture any number of images, (ii) providing feedback to the user to indicate that the images are being captured (e.g., shutter sounds, vibrations, etc.), and/or any other processes.

The method may end following operation 314.

Using the method shown in FIG. 3B, an image may be captured based on a user input of a voice command indicating a request to capture an image of a portion of a scene present to the user. By doing so, the image captured may be used in providing computer-implemented services for the user.

Turning to FIG. 3C, a third flow diagram illustrating a method of capturing a stereo image based on a user input of a pointing gesture in accordance with an embodiment is shown. The method may be performed, for example, by any of the components of the system of FIG. 1A, and/or other components not shown therein.

At operation 320, a guidance image depicting a portion of the scene and a portion of the user may be obtained. The guidance image may be obtained by: (i) monitoring, by at least one of the at least two image sensors, images (e.g., real-time pictures and/or video) of a scene that the user of the display free body wearable computing device is present, (ii) detecting that a portion of the user (e.g., one or more of the user's hands and/or portions of the user's hands) may be present, (iii) capturing an image based on criteria (e.g., when a predetermined portion of the user is detected), (iv) obtaining additional inputs (e.g., voice commands) from additional sensors at a time that the guidance image was captured, and/or any other process.

Figure 4A:
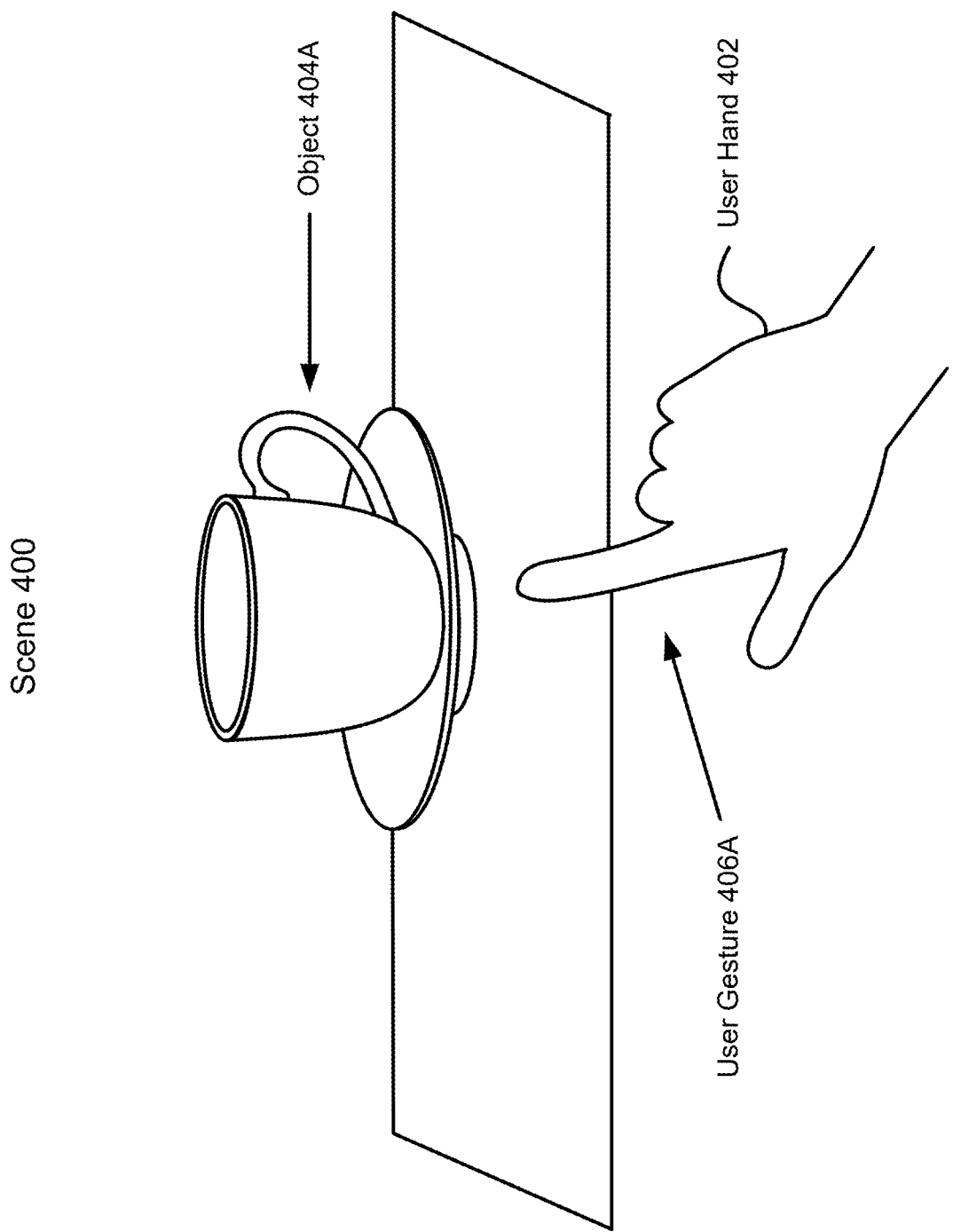
FIGS. 4A-4D show example diagrams illustrating activity that may occur during performance of methods in accordance with an embodiment.
Figure 4B:
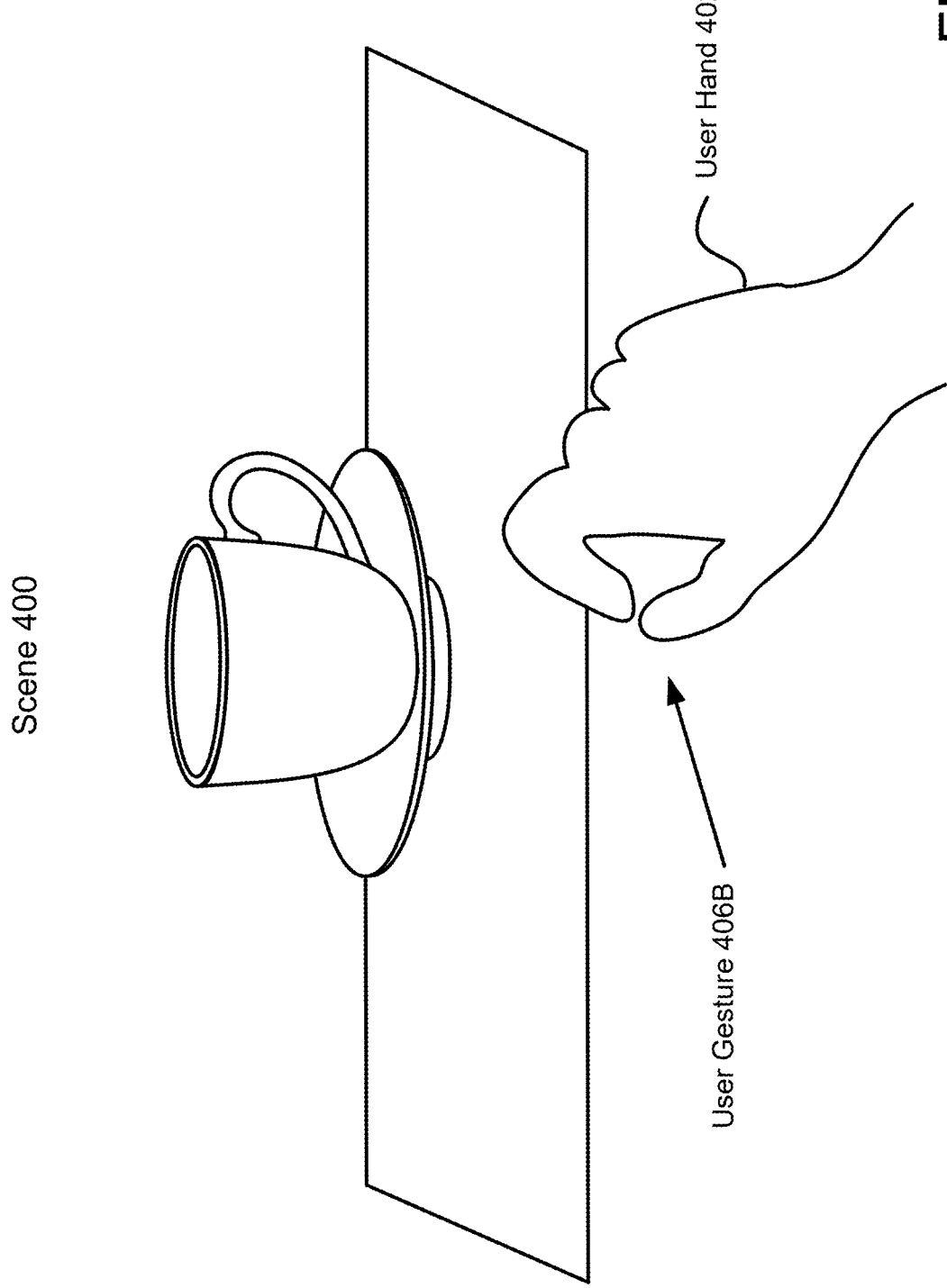

At operation 322, the portion of the user may be identified as depicting a pointing gesture and/or a snapshot gesture (and/or other type of gesture). The portion of the user may be identified as depicting a pointing gesture and/or a snapshot gesture by: (i) processing the guidance image obtained at operation 320, (ii) classifying a gesture performed by the portion of the user (e.g., based on prior inference model training), (iii) identifying the gesture as a pointing gesture (e.g., generally closed first with a finger extended), (iv) identifying an object that the user may be pointing to (e.g., by performing object segmentation, object recognition, etc.), and/or any other process. Refer to FIGS. 4A-4B for example illustrations.

At operation 324, movement of the user may be directed to remove the portion of the user from a field of view of the at least two image sensors and to retain the object in the field of view. The movement of the user may be directed by: (i) generating a customized audio instruction (e.g., an instructional phrase to lower hand and to keep looking at the object), (ii) outputting the audio instruction using speakers of the display free body wearable computing device, and/or performing any other actions.

At operation 326, at least two image sensors may be activated to capture a stereo image. The at least two image sensors may be activated by: (i) setting focus of each image sensor of the at least two image sensors based on the identified object, (ii) providing instructions to each of the at least two image sensors (e.g., cameras) to capture any number of images, (iii) providing feedback to the user to indicate that the images are being captured (e.g., shutter sounds, vibrations, etc.), and/or any other processes.

The method may end following operation 326.

Using the method shown in FIG. 3C, an image may be captured based on a user input of a pointing gesture indicating an object of the scene the user wishes to include in the image. By doing so, the image captured may be of higher relevance to the user.

Turning to FIG. 3D, a fourth flow diagram illustrating a method of capturing a stereo image based on a user input of a framing gesture in accordance with an embodiment is shown. The method may be performed, for example, by any of the components of the system of FIG. 1A, and/or other components not shown therein.

At operation 330, a guidance image depicting a portion of the scene and a portion of the user may be obtained. The guidance image may be obtained by: (i) monitoring, by at least one of the at least two image sensors, images (e.g., real-time pictures and/or video) of a scene that the user of the display free body wearable computing device is present, (ii) detecting that a portion of the user (e.g., one or more of the user's hands and/or portions of the user's hands) may be present, (iii) capturing an image based on criteria (e.g., when a predetermined portion of the user is detected), (iv) obtaining additional inputs (e.g., voice commands) from additional sensors at a time that the guidance image was captured, and/or any other process.

Figure 4C:
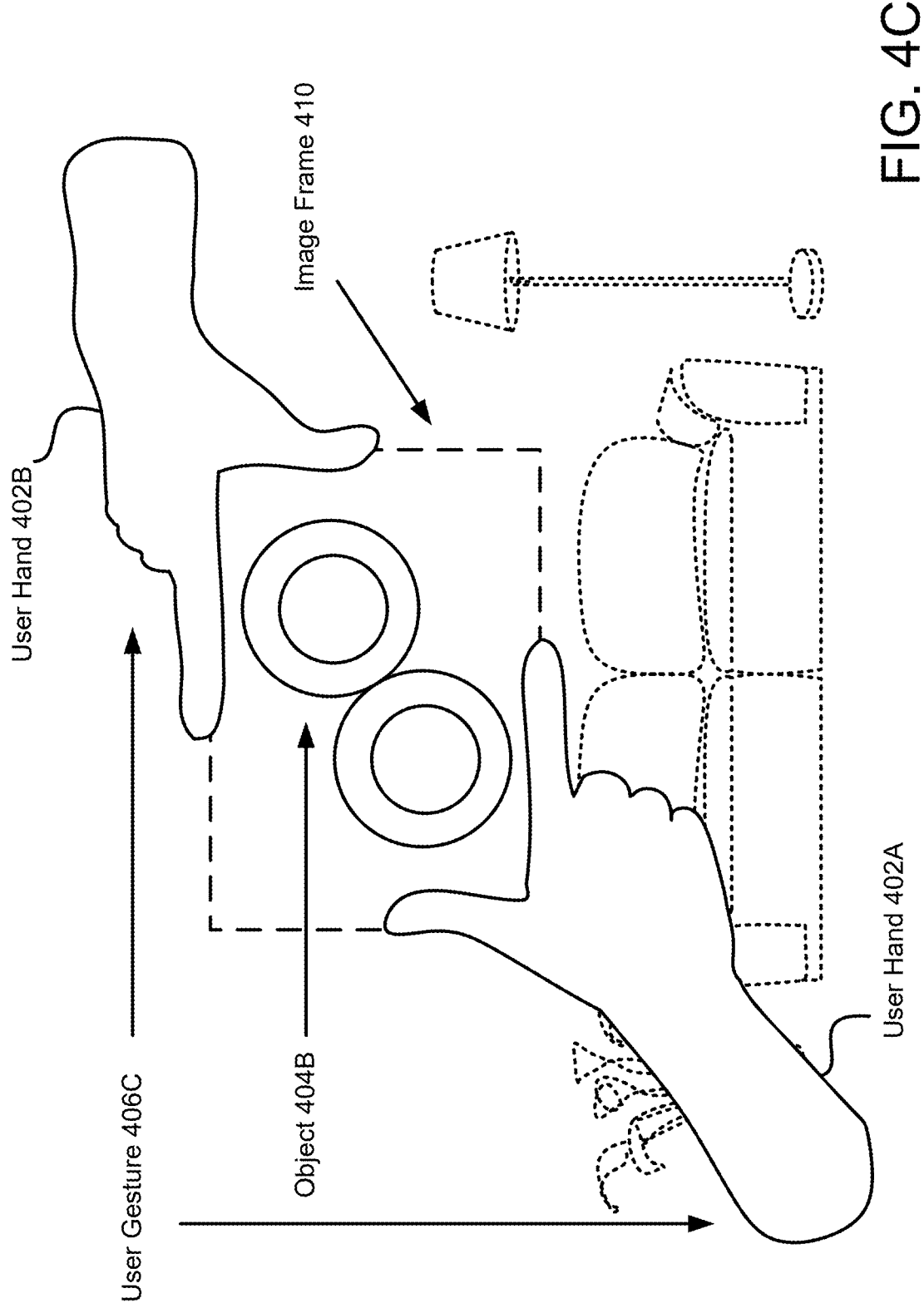

At operation 332, the portion of the user may be identified as depicting a framing gesture and/or a snapshot gesture. The portion of the user may be identified as depicting a pointing gesture and/or a snapshot gesture by: (i) processing the guidance image obtained at operation 330, (ii) classifying a gesture performed by the portion of the user (e.g., based on prior inference model training), (iii) identifying the gesture as a framing gesture (e.g., both hands of the user making pointing gestures, positioned at opposite corners of an imaginary rectangle shape), (iv) identifying a portion of the scene that the user wishes to capture based on reference points of the framing gesture (e.g., boundaries generated based on imaginary lines extending from thumbs and index fingers of the user's hands), and/or any other process. Refer to FIG. 4C for an example illustration.

At operation 334, movement of the user may be directed to remove the portion of the user from a field of view of the at least two image sensors and to retain the object in the field of view. The movement of the user may be directed by: (i) generating a customized audio instruction (e.g., an instructional phrase to lower hands and to keep looking at the object and/or portion of the scene), (ii) outputting the audio instruction using speakers of the display free body wearable computing device, and/or performing any other actions.

Figure 4D:
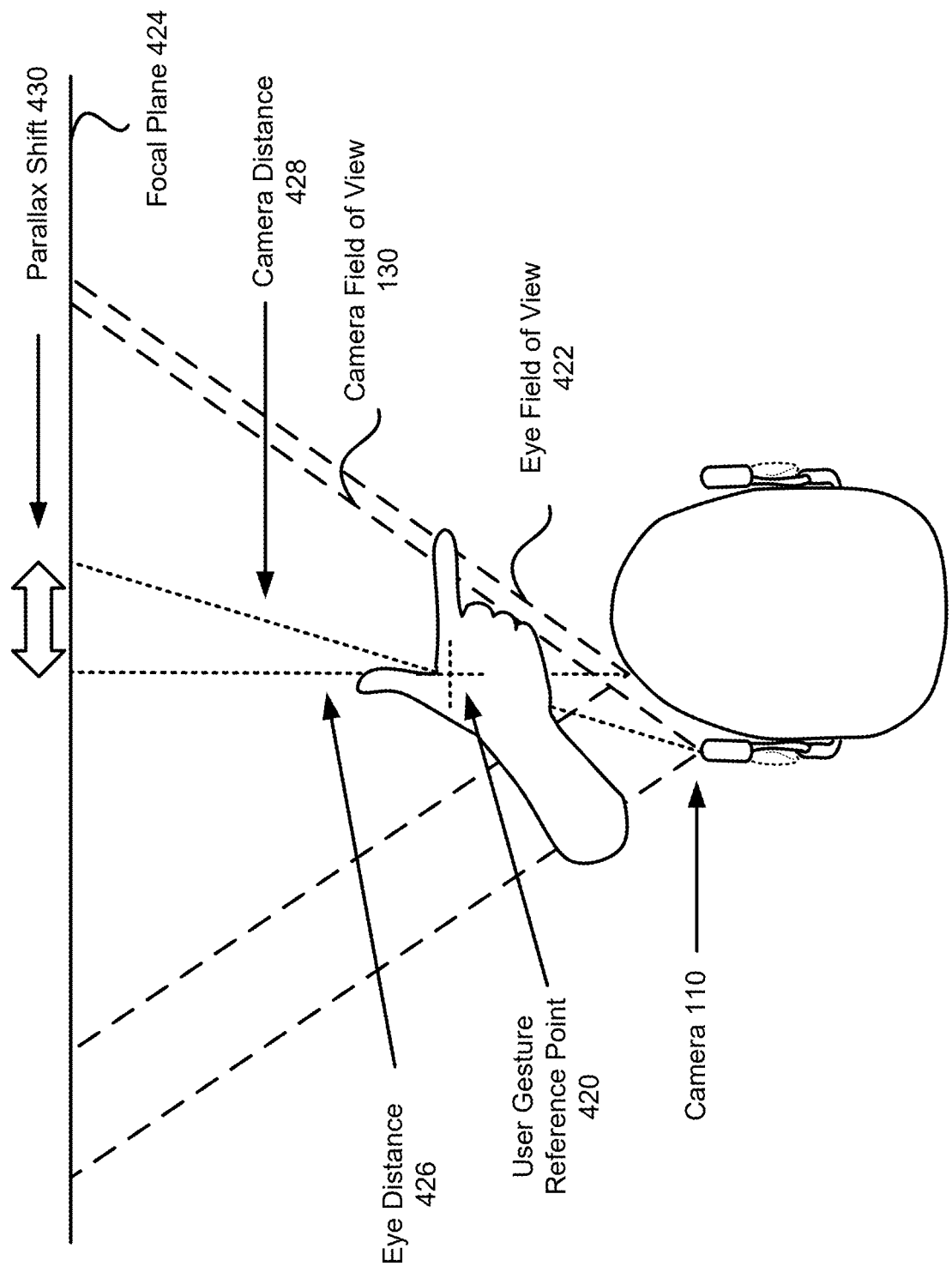

At operation 336, parallax correction may be performed to identify the portion of the scene. Parallax correction maybe performed by: (i) performing preprocessing operations on the guidance image and the framing gesture (e.g., object segmentation to identify a likely object that may be of interest to the user), (ii) measuring a distance between the hands (e.g., while performing the framing gesture) and the image sensors, (iii) identifying a distance to a focal point (e.g., the object of interest), (iv) calculating a parallax shift based on the distances to improve accuracy of a framing of the portion of the scene, and/or performing any other actions. Refer to FIG. 4D for an example illustration.

At operation 338, at least two image sensors may be activated to capture a stereo image. The at least two image sensors may be activated by: (i) setting focus of each image sensor of the at least two image sensors based on the identified framing, (ii) providing instructions to each of the at least two image sensors (e.g., cameras) to capture any number of images, (iii) providing feedback to the user to indicate that the images are being captured (e.g., shutter sounds, vibrations, etc.), and/or any other processes.

The method may end following operation 338.

Using the method shown in FIG. 3D, an image may be captured based on a user input of a framing gesture indicating a portion of the scene the user wishes to include in the image. By doing so, the image captured may be of higher relevance to the user.

Thus, using the method illustrated in FIGS. 3A-3D, a data processing system in accordance with an embodiment may be more likely to be able to obtain more relevant information to provide computer implemented services.

To further clarify details of the disclosed embodiments, FIGS. 4A-4D show example figures depicting activity that may occur while the methods shown in FIGS. 3A-3D are performed.

Turning to FIG. 4A, a first example diagram showing activity that may occur while an image is captured based on a user gesture performed by a user of display free body wearable computing device 50 in accordance with an embodiment is shown. FIG. 4A may be shown, for example, from a perspective of camera 110 of display free body wearable computing device 50.

In FIG. 4A, the user of display free body wearable computing device 50 may be present in scene 400. Scene 400 may include a portion of a scene present in a field of view of display free body wearable computing device 50 (e.g., camera field of view 130) and/or a field of view of the user. Scene 400 may include objects that may be of interest to the user for purposes of capturing an image. For example, scene 400 may include object 404A (e.g., a cup and saucer as shown in FIG. 4A) and/or any other objects (not shown).

Camera 110 may obtain a guidance image that depicts scene 400 and user hand 402, as shown. To do so, camera 110 may, for example, (i) continuously capture images (e.g., real-time video), (ii) detect for the user's hands in the images, and/or perform any other actions. When the guidance image is captured, a gesture (e.g., user gesture 406A) may be identified from the guidance image. User gesture 406A may be identified as a pointing gesture, where an index finger of user hand 402 is pointing to object 404A.

To identify an object that is of interest to the user, display free body wearable computing device 50 (e.g., integrated sensing and interaction component 100 and/or data processing system 114 of display free body wearable computing device 50) may perform any number and/or type of operations. For example, display free body wearable computing device 50 may (i) generate a projection of a point extending from the index finger of user hand 402, (ii) perform object segmentation and/or recognition services to identify objects in scene 400, (iii) obtain additional input (e.g., voice commands) from the user, and/or perform any other actions. By doing so, display free body wearable computing device 50 may identify object 404A as the object that is of interest to the user.

Display free body wearable computing device 50 may subsequently configure image capturing settings (e.g., focus to object 404A) to capture an image that may be desired by the user. To capture the image, display free body wearable computing device 50 may obtain additional user input from the user. Refer to FIG. 4B for additional details regarding a second user gesture for capturing images.

Turning to FIG. 4B, a second example diagram showing activity that may occur while an image is captured based on a user gesture performed by a user of display free body wearable computing device 50 in accordance with an embodiment is shown.

In FIG. 4B, the user of display free body wearable computing device 50 may perform user gesture 406B that may depict a snapshot gesture (e.g., moving of an index finger down towards a thumb of user hand 402, following the pointing gesture of user gesture 406A). User gesture 406B may be identified by display free body wearable computing device 50 (e.g., by performing actions similar to actions performed in identifying user gesture 406A, as discussed previously).

Display free body wearable computing device 50 may subsequently capture a stereo image based on the image capturing settings configured, as discussed in FIG. 4A, to include object 404A. To do so, display free body wearable computing device 50 may (i) direct movement of the user, using speakers of integrated sensing and interaction component 100 (e.g., via verbal instructions), to remove user hand 402 from the field of view (e.g., by lowering user hand 402) and retain object 404A in the field of view (e.g., by not moving the user's head), (ii) activating camera 110 to capture the stereo image, and/or performing any other actions.

Thus, using the user gestures shown in FIGS. 4A-4B, display free body wearable computing device 50 may capture images of a scene by interpreting the user gestures to identify an object of interest and configuring image capturing settings to capture images that may be more desirable to the user.

Turning to FIG. 4C, a third example diagram showing activity that may occur while an image is captured based on a user gesture performed by a user of display free body wearable computing device 50 in accordance with an embodiment is shown.

In FIG. 4C, the user of display free body wearable computing device 50 may perform user gesture 406C that may depict a framing gesture. The framing gesture may be performed by the user, for example, by using both hands to make pointing gestures with thumbs extended, positioned at opposite corners of an imaginary rectangle shape that may indicate boundaries of a portion of a scene that the user wishes to capture in the image.

Camera 110 of display free body wearable computing device 50 may obtain a guidance image that depicts the scene and user gesture 406C, as shown. The guidance image may be used to identify the portion of the scene and/or an object of interest in the portion of the scene that the user may be interested in capturing an image. For example, as shown in FIG. 4C, the user may wish to capture an image of at least object 404B (e.g., a decorative item, as shown in solid lines) while excluding additional objects from the scene (e.g., a couch, a plant, and a lamp, as shown in short-dashed lines) by performing user gesture 406C.

To identify the portion of the scene, display free body wearable computing device 50 may, for example, (i) project lines extending from the index fingers and thumbs of the user's hands while performing user gesture 406C, (ii) use a portion of the user's hands (e.g., a point on the user's hands between the index finger and the thumb) as a reference point, and/or any other processes. By doing so, display free body wearable computing device 50 may identify and/or generate image frame 410 (shown in long-dashed lines) that indicates the desired portion of the scene.

However, a quality (e.g., accuracy, precision, etc.) of image frame 410 may be impacted due to variations in distances between camera 110, the user's hands while performing gesture 406 in a field of view of camera 110, an object of interest in image frame 410, and/or any other entities. For example, the guidance image obtained based on a field of view of a first camera of camera 110 (e.g., a camera positioned on a left side of the user's head from the user's perspective) may include user hand 402A. When user hand 402A is a certain distance from camera 110, user hand 402A may only be captured by the first camera and may obscure object 404B in image frame 410 and/or may shift a desired boundary of image frame 410 based on parallax (e.g., a shift in position of an object when viewed from different positions).

To improve a likelihood that an image captured by display free body wearable computing device 50 may include the desired portion of the scene (e.g., based user gesture 406C performed from the user's perspective), display free body wearable computing device 50 may perform operations to improve the quality of image frame 410. The operations may include, for example, object segmentation (e.g., identifying objects at least partially included in image frame 410 that may be of interest to the user), parallax correction, and/or any other processes. Refer to FIG. 4D for additional details regarding parallax correction performed by display free body wearable computing device 50.

Display free body wearable computing device 50 may subsequently capture a stereo image based on image frame 410 and/or any modifications to image frame 410. To do so, display free body wearable computing device 50 may (i) direct movement of the user, using speakers of integrated sensing and interaction component 100 (e.g., via verbal instructions), to remove user hands from the field of view (e.g., by lowering user hand 402A and user hand 402B) and retain image frame 410 in the field of view (e.g., by not moving the user's head), (ii) activating camera 110 to capture the stereo image, and/or performing any other actions.

Thus, using the method shown in FIG. 4C, display free body wearable computing device 50 may identify a portion of a scene to capture an image based on an image frame interpreted from a user gesture from a user.

Turning to FIG. 4D, a fourth example diagram showing activity that may occur while an image is captured based on a user gesture performed by a user of display free body wearable computing device 50 in accordance with an embodiment is shown. For example, the fourth example diagram may show activity performed to facilitate parallax correction performed by display free body wearable computing device 50 based on user input of a framing gesture (e.g., user gesture 406C as discussed in FIG. 4C).

Due to a positioning of a camera of camera 110 relative to a user's eye on the same side of the user's head, the user's hand (e.g., while performing user gesture 406C) may appear shifted when viewed in camera field of view 130 by the camera of camera 110 and compared to when viewed in eye field of view 422 by the user's eye. The shift in views of the user's hand may subsequently impact a quality (e.g., accuracy) of a frame of a portion of a scene that the user may desire to obtain an image.

To correct for the shift, display free body wearable computing device 50 may perform parallax correction. To do so, display free body wearable computing device 50 may: (i) identify user gesture reference point 420 (e.g., a point of the user's hand while performing user gesture 406C), (ii) identify focal plane 424 (e.g., an object of interest and/or a focused area of the scene), (iii) identify eye distance 426 (e.g., distance between the user's eye and focal plane 424 through user gesture reference point 420) and camera distance 428 (e.g., distance between the camera 110 and focal plane 424 through user gesture reference point 420), (iv) calculate a difference between camera distance 428 and eye distance 426 to obtain parallax shift 430, (v) apply parallax shift 430 to configure image settings (e.g., frame, focus, etc.), and/or perform any other actions.

The parallax correction may be performed by sensors (e.g., camera sensors, time-of-flight (ToF sensors), etc.) of integrating sensing and interaction component 100 and/or data processing system 114 of display free body wearable computing device 50.

Thus, using the method shown in FIG. 4C, a quality of an image captured by display free body wearable computing device 50 based on a framing gesture may be improved. By doing so, the portion of scene captured in the image may be of higher relevance to the user.

Figure 5:
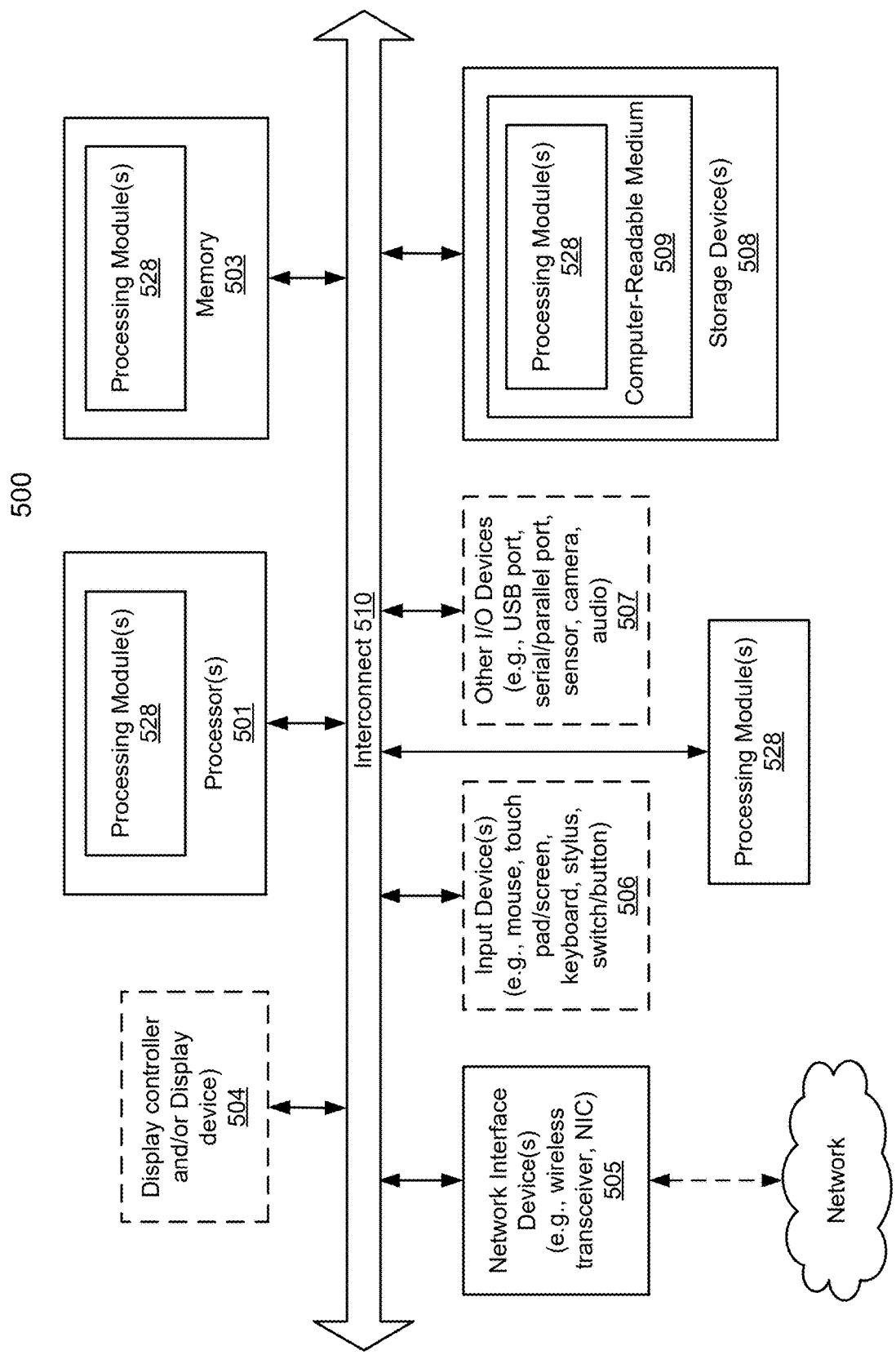
FIG. 5 shows a block diagram illustrating a data processing system in accordance with an embodiment.

Any of the components illustrated in FIGS. 1A-2 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone array to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for capturing images of a scene using a display free body wearable computing device, the method comprising:
    obtaining, using at least one sensor of the display free body wearable computing device, at least one portion of user input from a user;
    interpreting the at least one portion of user input to identify a portion of the scene that the user wishes to capture in an image of the images;
    obtaining, using at least two image sensors of the display free body wearable computing device, a stereo image depicting at least the portion of the scene; and
    combining the stereo image to obtain the image.

2. The method of claim 1, wherein obtaining the at least one portion of user input comprises:
    obtaining, using a microphone array of the at least one sensor, a voice command from the user.

3. The method of claim 1, wherein obtaining the at least one portion of user input comprises:
    obtaining, using at least one of the at least two image sensors, a guidance image depicting a portion of the scene and a portion of the user of the display free body wearable computing device.

4. The method of claim 3, wherein interpreting the at least one portion of user input comprises:
    identifying, using the guidance image, an object depicted in the scene that is of interest to the user.

5. The method of claim 4, wherein obtaining the stereo image comprises:
    directing, to obtain a desirable field of view for the at least two image sensors, movement of the user to:
        remove the portion of the user from a field of view of the at least two image sensors, and
        retain the object in the field of view; and
    while the desirable field of view is present, activating the at least two image sensors to capture the stereo image.

6. The method of claim 3, wherein the portion of the user depicts a recognizable gesture.

7. The method of claim 6, wherein the recognizable gesture is a pointing gesture used by the user to convey interest in an object in the scene to the display free body wearable computing device.

8. The method of claim 6, wherein the recognizable gesture is a framing gesture used by the user to convey interest in a portion of the scene.

9. The method of claim 8, further comprising:
    identifying a distance between the portion of the user and the at least two image sensors; and
    performing, using the distance and the guidance image, parallax collection to identify the portion of the scene.

10. The method of claim 1, wherein the display free body wearable computing device comprises:
    an integrated sensing and interaction component adapted to:
        be positioned symmetrically on two portions of a user's head,
        be positioned between ears and eyes of the user, and
        capture a stereo image of at least a portion of a scene present in a field of view of the user;
    an integrated computing, powering, and securing portion; and
    an adjustment member adapted to position the integrated sensing and interaction component with respect to the integrated computing, powering, and securing portion.

11. The method of claim 10, wherein the integrated sensing and interaction component comprises:
    a pair of cameras;
    speakers;
    a microphone array; and
    a touch pad.

12. The method of claim 11, wherein the integrated sensing and interaction component is adapted to:
    obtain the stereo image from the pair of cameras;
    at least partially process the stereo image to obtain an image processing result;
    identify an action to be performed based, at least in part, on the image processing result and a derived result from a remote entity, the derived result being based, at least in part, on the stereo image and/or the image processing result; and
    use at least the speakers to perform the action.

13. The method of claim 11, wherein the pair of cameras comprise lenses configured to:
    establish a camera line of sight that is parallel to a line of sight of the user; and
    establish a camera field of view that comprises the field of view of the user.

14. The method of claim 11, wherein the stereo image comprises a pair of images of the scene, each of the images being captured at different angles and/or positions with respect to the scene by the pair of cameras.

15. A non-transitory machine-readable medium having instructions stored therein, which when executed by a processor, cause the processor to perform operations for capturing images of a scene using a display free body wearable computing device, the operations comprising:
   obtaining, using at least one sensor of the display free body wearable computing device, at least one portion of user input from a user;
   interpreting the at least one portion of user input to identify a portion of the scene that the user wishes to capture in an image of the images;
   obtaining, using at least two image sensors of the display free body wearable computing device, a stereo image depicting at least the portion of the scene; and
   combining the stereo image to obtain the image.

16. The non-transitory machine-readable medium of claim 15, wherein obtaining the at least one portion of user input comprises:
   obtaining, using a microphone array of the at least one sensor, a voice command from the user.

17. The non-transitory machine-readable medium of claim 15, wherein obtaining the at least one portion of user input comprises:
   obtaining, using at least one of the at least two image sensors, a guidance image depicting a portion of the scene and a portion of the user of the display free body wearable computing device.

18. A data processing system, comprising:
   a processor;
   and a memory coupled to the processor to store instructions, which when executed by the processor, cause the processor to perform operations for capturing images of a scene using a display free body wearable computing device, the operations comprising:
      obtaining, using at least one sensor of the display free body wearable computing device, at least one portion of user input from a user;
      interpreting the at least one portion of user input to identify a portion of the scene that the user wishes to capture in an image of the images;
      obtaining, using at least two image sensors of the display free body wearable computing device, a stereo image depicting at least the portion of the scene; and
      combining the stereo image to obtain the image.

19. The data processing system of claim 18, wherein obtaining the at least one portion of user input comprises:
   obtaining, using a microphone array of the at least one sensor, a voice command from the user.

20. The data processing system of claim 18, wherein obtaining the at least one portion of user input comprises:
   obtaining, using at least one of the at least two image sensors, a guidance image depicting a portion of the scene and a portion of the user of the display free body wearable computing device.

* * * * *